United States Patent
Stribady et al.

(10) Patent No.: US 11,243,810 B2
(45) Date of Patent: Feb. 8, 2022

(54) METHODS AND SYSTEMS FOR IMPROVING HARDWARE RESILIENCY DURING SERIAL PROCESSING TASKS IN DISTRIBUTED COMPUTER NETWORKS

(71) Applicant: The Bank of New York Mellon, New York, NY (US)

(72) Inventors: Sanjay Kumar Stribady, Monmouth Junction, NJ (US); Saket Sharma, Edison, NJ (US); Gursel Taskale, Manhasset, NY (US)

(73) Assignee: The Bank of New York Mellon, New York, NY (US)

( * ) Notice: Subject to any disclaimer, the term of this patent is extended or adjusted under 35 U.S.C. 154(b) by 0 days.

(21) Appl. No.: 17/155,711

(22) Filed: Jan. 22, 2021

(65) Prior Publication Data

US 2021/0191766 A1    Jun. 24, 2021

Related U.S. Application Data

(63) Continuation-in-part of application No. 16/001,772, filed on Jun. 6, 2018, now abandoned.

(51) Int. Cl.
| | |
|---|---|
| *G06F 9/48* | (2006.01) |
| *G06F 9/451* | (2018.01) |
| *H04L 29/08* | (2006.01) |
| *G06F 16/25* | (2019.01) |
| *G06N 20/00* | (2019.01) |
| *G06F 16/23* | (2019.01) |

(Continued)

(52) U.S. Cl.
CPC ............ *G06F 9/4881* (2013.01); *G06F 9/451* (2018.02); *G06F 16/2379* (2019.01); *G06F 16/258* (2019.01); *G06N 20/00* (2019.01); *H04L 9/3239* (2013.01); *H04L 63/12* (2013.01); *H04L 67/10* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,596,314 B1 * | 3/2017 | Eldawy | H04L 67/02 |
| 10,075,298 B2 * | 9/2018 | Struttmann | G06F 21/6218 |
| 11,038,948 B2 * | 6/2021 | Achkir | G06F 21/62 |

(Continued)

OTHER PUBLICATIONS

Cui et al, Continuous online sequence learning with an unsupervised neural network model, ACM, vol. 28, pp. 2474-2504 (Year: 2016).*

(Continued)

*Primary Examiner* — Abu Zar Ghaffari
(74) *Attorney, Agent, or Firm* — Pillsbury Winthrop Shaw Pittman, LLP

(57) ABSTRACT

The system uses the non-repudiatory persistence of blockchain technology to store all task statuses and results across the distributed computer network in an immutable blockchain database. Coupled with the resiliency of the stored data, the system may determine a sequence of processing tasks for a given processing request and use the sequence to detect and/or predict failures. Accordingly, in the event of a detected system failure, the system may recover the results prior to the failure, minimizing disruptions to processing the request and improving hardware resiliency.

16 Claims, 13 Drawing Sheets

(51) Int. Cl.
*H04L 29/06* (2006.01)
*H04L 9/32* (2006.01)

(56) References Cited

U.S. PATENT DOCUMENTS

| | | | |
|---|---|---|---|
| 2012/0210428 A1 | 8/2012 | Blackwell | |
| 2013/0138475 A1 | 5/2013 | Allison | |
| 2016/0140956 A1* | 5/2016 | Yu | G10L 15/16 |
| | | | 704/240 |
| 2017/0012843 A1 | 1/2017 | Zaidi | |
| 2017/0109639 A1* | 4/2017 | Marcu | G06F 8/30 |
| 2017/0126702 A1 | 5/2017 | Krishnamurthy | |
| 2017/0366357 A1 | 12/2017 | Pattanaik | |
| 2018/0052739 A1 | 2/2018 | Castagna | |
| 2018/0089436 A1 | 3/2018 | Smith | |
| 2018/0144264 A1* | 5/2018 | Ranzato | G06N 20/00 |
| 2018/0150783 A1* | 5/2018 | Xu | G06N 20/00 |
| 2018/0190375 A1* | 7/2018 | Chapela | A61B 5/486 |
| 2018/0211522 A1 | 7/2018 | Furuichi | |
| 2018/0239507 A1* | 8/2018 | Bui | G06F 16/345 |
| 2019/0130249 A1* | 5/2019 | Bradbury | G06N 3/08 |
| 2019/0130273 A1* | 5/2019 | Keskar | G06F 40/58 |
| 2019/0182055 A1* | 6/2019 | Christidis | H04L 9/3297 |
| 2019/0188046 A1* | 6/2019 | Florissi | H04L 63/0209 |
| 2019/0207750 A1* | 7/2019 | Harvey | H04L 9/0637 |
| 2019/0266534 A1* | 8/2019 | Kessaci | G06F 9/45558 |
| 2019/0281065 A1* | 9/2019 | Xia | H04L 63/102 |
| 2019/0370058 A1* | 12/2019 | Gupta | G06F 9/5038 |
| 2019/0386969 A1* | 12/2019 | Verzun | H04L 63/102 |
| 2020/0042361 A1* | 2/2020 | Clark | G06F 9/5072 |
| 2020/0204352 A1* | 6/2020 | Thompson | H04L 9/3239 |
| 2021/0034606 A1* | 2/2021 | Stamos | G06F 16/211 |

OTHER PUBLICATIONS

PCT International Search Report and Written Opinion dated Sep. 18, 2019 issued in International Patent Application No. PCT/US2019/033851.

\* cited by examiner

METHODS AND SYSTEMS FOR IMPROVING HARDWARE RESILIENCY DURING SERIAL PROCESSING TASKS IN DISTRIBUTED COMPUTER NETWORKS

CROSS-REFERENCE TO RELATED APPLICATIONS

This application is a Continuation-In-Part Application of U.S. Ser. No. 16/001,772, filed Jun. 6, 2018, the contents of which is hereby incorporated by reference in its entirety.

FIELD OF THE INVENTION

Embodiments of the invention generally relate to processing tasks using a computer system having multiple applications, and more specifically to tracking and recovering processing tasks.

BACKGROUND

In conventional computer systems, tasks are often processed by computing systems across multiple applications. For example, to fulfill a processing task, a first application may perform steps to initiate the processing task, a second application may perform steps to obtain approval for the processing task, and a third system may perform steps to result the processing task. That is, each application may pass the output or result of one application to another application for further processing. Processing tasks may be fulfilled and completed, though in some circumstances, processing task errors may occur. Processing task errors may arise due to native issues (e.g., an application fails, network loads, etc.) or due to malicious actors (e.g., cyberattacks, fraudulent actions, or hacking). Therefore, identifying processing tasks that have been affected by processing task errors is important for ensuring that processing tasks are appropriately completed.

As the number of processing tasks scales upward however, the execution of processing tasks across the multiple applications becomes complex. If a processing task error occurs, conventional applications are not equipped to identify, amongst the numerous processing tasks, which particular processing task is affected and to what extent the parties involved are affected. Therefore, a processing task error can be problematic as significant resources, such as time and human effort, may need to be dedicated to identify the particular processing task and to trace and rectify the processing task error. Due to the difficulty in identifying, tracing, and rectifying these errors, the result is often a system failure such as a hardware crash.

SUMMARY

Accordingly, methods and systems are described herein for improving hardware resiliency during serial processing tasks in distributed computer networks. In particular, the system uses may use the non-repudiatory persistence of blockchain technology to store all task statuses and results across the distributed computer network in an immutable blockchain database. Coupled with the resiliency of the stored data, the system provides an unconventional method of detecting failures during serial processing. For example, the system may determine a sequence of processing tasks for a given processing request and use the sequence to detect and/or predict failures. Accordingly, in the event of a detected system failure, the system may recover the results prior to the failure, minimizing disruptions to processing the request and improving hardware resiliency. However, such a system introduces several technical hurdles.

First, the system needs to monitor and/or detect the status of the processing tasks. This is complicated, as conventional applications often have unique inputs and/or outputs related to their processing tasks. Accordingly, the system uses a network specific schema (e.g., a universal schema) for processing tasks and/or results of those processing tasks, a schema that maintains a unique identifier for the request in each processing task. The system may then monitor the series of processing tasks for a given processing request through the use of a network specific identifier present in a result of each processing task. However, while the unique identifier allows the system to determine what processing tasks are related to the request, the unique identifier does not indicate an order or sequence of those processing tasks. Accordingly, the system also tracks a time stamp corresponding to each processing task and/or completion of the processing task.

The system may then iteratively and/or continuously filter or search processing tasks undertaken by the system for tasks featuring a unique identifier and/or a corresponding time stamp of those tasks. The system may then organize the tasks related to the request and their corresponding time stamps to determine a lineage or processing route of the request through the network. Using this mechanism, the system does not need to know prior to submission (or during processing) what the lineage or processing route of the request through the network will be (which may in fact be unknown). Nonetheless, the system may monitor a current status of the request and its respective processing tasks.

The system may use these statuses and/or triggers based on time intervals between completions of one or more processing tasks to detect current and/or potential errors. For example, in some embodiments, the system may use machine learning models that are trained to detect potential dynamically selected sequences (e.g., future lineages or processing routes of requests) based on training data that comprises lineages or processing routes for requests that are labeled with known future lineages or processing routes for the respective request. The system may then alert users to current and/or potential errors allow users to identify, trace, and rectify these errors (e.g., by re-routing a processing tasks and/or resolving a malfunctioning application) and thus avoiding undetected delays, hardware crashes, and system failures.

For example, the system monitors processing tasks as the processing tasks are performed across different processing task processing applications. The system receives results that indicate the steps of each processing task that have been successfully performed. The system writes blocks of the results into a first blockchain, hereafter referred to as a master blockchain. Maintenance of the master blockchain ensures that the system maintains an immutable record of all steps that have been performed for the various processing tasks. The system further generates blocks of results in additional blockchains, hereafter referred to as lineage blockchains. Each lineage blockchain includes an immutable record of results that correspond to the steps of a specific processing task. In other words, each lineage blockchain includes a subset of the results that are included in the master blockchain, re-ordered into a sequence of results corresponding to the steps of the particular processing task. In various embodiments, the lineage blockchains can be generated from the results included in the master blockchain. Thus, as a lineage blockchain can be generated from the master blockchain, a lineage blockchain specific for a processing task can be discarded from memory when no longer needed (e.g., once the processing task completes and/or request is completed).

The system periodically determines the state of each processing task, which represents a current stage of the processing task after the most recently performed step of the processing task, by accessing the blocks of results of the lineage blockchains. If a processing task is not in an expected state, the system determines that a processing task exception (e.g., a processing task error) has occurred for the processing task. The system can determine whether the processing task has been inappropriately altered by comparing the immutable data of the blocks in the lineage blockchain against the datastream resulted from the processing task experiencing an exception. Once the exception has been identified, the system can address the processing task exception by initiating a recovery process such that the remaining steps in the processing task are performed.

The benefits of embodiments of the invention described herein are several-fold. First, conventional systems often handle large volumes of processing tasks at any given time but do not have an ability to track the current state of a processing task as it is being performed. For example, many conventional systems may implement a ledger that merely tracks a running balance as processing tasks are executed. Here, the system enables the tracking of processing tasks at a high level of specificity. Specifically, the system can monitor the individual steps of the processing task as they are performed, noting their order and their completion state. Monitoring the performed steps of a processing task enables the identification of processing task exceptions that may occur when handling large volumes of processing tasks. Additionally, by monitoring the individual steps of processing tasks, the system can identify processing task errors as they are developing in real-time. For example, the system can identify that a threshold number of processing tasks have stalled as well as the particular processing task, application, and/or request. Therefore, the system can take appropriate remedial action to ensure that the processing task errors corresponding to the processing tasks do not develop into more severe and widespread problems.

Second, implementing the master blockchain and individual lineage blockchains leverages the immutability of blockchain technology. This enables the detection of unauthorized changes that may arise due to malicious activity and/or processing task errors at particular steps of a processing task.

Third, lineage blockchains can be generated from the persistently stored master blockchain and therefore, lineage blockchains can be discarded from memory when they are no longer needed (e.g., when processing tasks are completed). Not having to persistently store lineage blockchains reduces the quantity of computational resources (e.g., computer memory) that are consumed to maintain the blockchains.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION OF THE DRAWINGS

Figure 1:
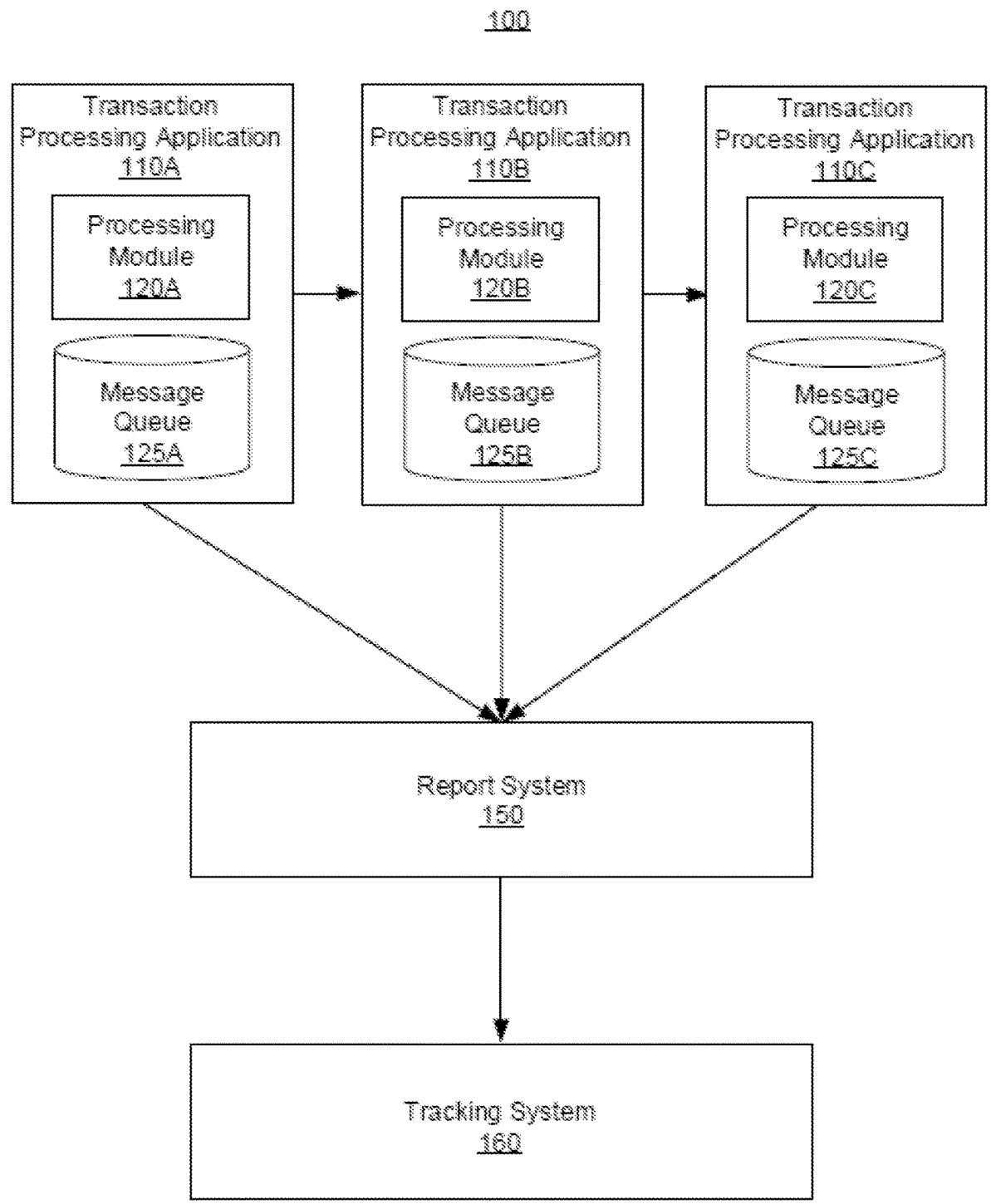
FIG. 1 depicts an overall system environment for tracking and recovering processing tasks, in accordance with an embodiment.

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed such as those, e.g., described in U.S. patent application Ser. No. 16/001,772 filed on Dec. 12, 2019, which is hereby incorporated by reference in its entirety.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "processing task processing application 110A," indicates that the text refers specifically to the element having that particular reference numeral. A reference numeral in the text without a following letter, such as "processing task processing application 110," refers to any or all of the elements in the figures bearing that reference numeral (e.g. "processing task processing application 110" in the text refers to reference numerals "processing task processing application 110A" and/or "processing task processing application 110B" in the figures).

Overall System Environment

FIG. 1 depicts an overall system environment 100 for tracking and recovering processing tasks, in accordance with an embodiment. For example, system environment 100 may be used for improving hardware resiliency during serial processing tasks in distributed computer networks using blockchains. The system environment 100 can include one or more processing task processing applications 110, a result system 150, and a tracking system 160. Generally, the result system 150 and the tracking system 160 included in the system environment 100 enable the tracking of processing tasks as they are being processed by the processing task processing applications 110. By tracking the processing tasks, when a processing task exception occurs, the affected processing task can be rapidly identified, recovered, and executed as intended.

Although FIG. 1 depicts three processing task processing applications 110, in other embodiments, there may be fewer or additional processing task processing applications 110. Additionally, although FIG. 1 depicts a result system 150 that is separate from the tracking system 160, in various embodiments, the result system 150 and the tracking system 160 can each be associated with an entity and can be operated by that same entity. In some embodiments, the result system 150 and the tracking system 160 can function as a single system.

In one embodiment, each of the processing task processing applications 110, result system 150, and tracking system 160 are embodied as a single system. Therefore, the single system can internally track states of processing tasks and recover processing tasks when needed. In other embodiments, each of the processing task processing applications 110, result system 150, and tracking system 160 are separate systems and communicate with one another through a network, such as any wired or wireless local area network (LAN) and/or wide area network (WAN), such as an intranet, an extranet, or the Internet.

Generally, a processing task processing application 110 performs one or more steps of a processing task and for each performed step, the processing task processing application 110 generates a message representing the completion of the step of the processing task. This message is appended to other messages in the blockchain lineage. Each processing task processing application may perform steps for a particular phase of a processing task (e.g., creation, validation, execution, resulting phases). The result system 150 collects the messages generated by each of the processing task processing applications 110 and converts the messages into results. The tracking system 160 incorporates results into an immutable master blockchain such that each step of each processing task that has been performed by a processing task processing application 110 is reflected by a result in the master blockchain. The tracking system 160 further creates lineage blockchains that are each specific for a processing task. The tracking system 160 accesses lineage blockchains to determine states of the processing task and identify processing task exceptions. Thus, the tracking system 160 can rectify a processing task exception by initiating the recovery process for the processing task.

As used herein, a processing task refers to an individual, indivisible operation that completes or fails as a single operation. A processing task can be performed in multiple steps, though if a single step in the processing task fails, then the processing task as a whole fails. As several examples, a processing task may involve reading information from a storage location in a computer system, writing information to a location, or performing processing on a unit of information. Computer systems perform processing tasks for a wide variety of purposes. For example, processing task processing is especially useful in computing environments for tracking the state of a large number of entities, such as managing airline reservations, executing item purchases, tracking movement and/or location of items (e.g., in a warehouse), and asset transfers. Processing task processing may also be used in computing environments such as database systems, web servers, autonomous vehicle control, etc. In some embodiments, a processing task may correspond to a blockchain transaction and/or result thereof. For example, blockchain is a system of recording information in a way that makes it difficult or impossible to change, hack, or cheat the system. A blockchain is essentially a digital ledger of transactions that is duplicated and distributed across the entire network of computer systems on the blockchain. Each processing task may correspond to a given transaction and/or a series of transactions. Additionally or alternatively, the processing tasks may refer to individual transactions, small segments of steps, or larger trajectories spanning multiple domains.

For example, as described herein, each application performs an individual transaction that is updated to the lineage of the blockchain (i.e., the blockchain ledger or record of all past transactions). Each application (e.g., which may be responsible for checking a credit score, verifying account liquidity, etc. along a wire verification process) results in an individual transaction occurring at that application. The blockchain lineage is then updated with a "result" (or "message") of that transaction. This causes in a single blockchain lineage to have different lengths after different transactions.

For example, a blockchain lineage following a first transaction may record transaction one, a blockchain lineage following the first transaction and then a second transaction may record transaction one and transaction two, a blockchain lineage following a third transaction may record transaction one, two, and three.

The system may search each of these "multiple" blockchain lineages (each corresponding to the same request. The system then filters (based on a unique ID) all blockchain lineages to identify all block chain lineages corresponding to result). The system then looks to see which blockchain lineage was last (based on the last received time stamp). Based on the last transaction, the system determines previous route and provide a current status of the request. The system may then use this information to predict where the request is heading (what applications is likely to be used next) and check for potential issues (e.g., a downed server, etc.).

Referring to FIG. 1, processing task processing applications 110 may be organized in series. Therefore, in order to fully execute a processing task, a first processing task processing application 110 provides information to perform steps of the processing task to a second processing task processing application 110 located downstream from the first processing task processing application 110. Specifically, processing task processing application 110A may perform a first set of steps for a first phase of a processing task. The processing task processing application 110A passes the output of the first set of steps of the processing task to the processing task processing application 110B, which performs a second set of steps for a second phase of the same processing task. The processing task processing application 110B passes the output of the second set of steps of the processing task to the processing task processing application 110C, which performs a third set of steps for a third phase of the processing task.

In various embodiments, each processing task processing application 110 may operate using individual processor(s) and/or other hardware, such as hardware of a computing device. In other embodiments, each processing task processing application 110 may be an individual terminal of the same system. Although three processing task processing applications 110 are illustrated in FIG. 1, in other embodiments the environment 100 may include fewer or more than three processing task processing applications 110 for performing steps of a processing task.

As shown in FIG. 1, each processing task processing application 110 includes a processing module 120 and a message queue 125. The processing module 120 receives information for performing one or more steps of a processing task, performs the one or more steps of the processing task using the received information, generates messages for the performed steps of the processing task, and stores the generated messages in the message queue 125.

In various embodiments, the processing module 120 of a processing task processing application 110 receives information for performing steps of a processing task from an external system or from an upstream processing task processing application 110. In one embodiment, referring to FIG. 1, the processing module 120A of the furthest upstream processing task processing application 110A receives information from an external system to initiate a processing task. Such information can be in the form of a processing task request that identifies one or more parties involved in the processing task as well as assets that are to be transferred between the one or more parties. Thus, the processing module 120A can perform the steps corresponding to the creation phase of the processing task.

In various embodiments, the processing module 120 (e.g., such as processing modules 120B or 120C) receives information from an upstream processing task processing application 110 that enables the processing module 120B or 120C to perform steps corresponding to subsequent phases of the processing task. An upstream processing task processing application 110 refers to a processing task processing application located earlier in the series. For example, as shown in FIG. 1, processing task processing application 110A an upstream processing task processing application relative to processing task processing application 110B and/or 110C. Information received from an upstream processing task processing application includes information such as an identifier assigned to the processing task by the upstream processing task processing application 110. Examples of an identifier assigned to the processing task are described in further detail below.

Based on the received information, the processing module 120 performs one or more steps of the processing task. For example, referring to FIG. 1, processing module 120A of processing task processing application 110A may perform a series of steps to initiate the processing task. Processing module 120B of processing task processing application 110B may perform a series of steps to execute an intermediate phase of the processing task. Processing module 120C of processing task processing application 110C may perform a series of steps to result the executed processing task.

For each step of the processing task that the processing module 120 performs, the processing module 120 generates a message corresponding to the step of the processing task, thereby reflecting the fact that the step of the processing task has been performed. In various embodiments, the generated message includes a payload that represents parameters of the processing task. Parameters of the processing task can represent the task being performed during the processing task and can include information such as the parties involved in the processing task, the amount of an asset being transferred between the parties, and the time/date that the processing task was initiated. In some embodiments, the processing module 120 includes one or more identifiers in the message. Generally, the identifiers represent identifying information of steps of the processing task. The one or more identifiers in messages facilitate the subsequent processing and tracking of the messages.

In one embodiment, the processing module 120 assigns a linkage identifier to the message. The linkage identifier serves as a value that is assigned to all messages that correspond to steps of a single processing task performed by a single processing module 120. In other words, the linkage identifier can be used to identify all messages related to a specific processing task that were processed by a processing module 120 of a particular processing task processing application 110. In various embodiments, the processing module 120 assigns an action identifier to the message. Here, the action identifier refers to a particular action of the performed step of the processing task. For example, an action identifier may be a transfer action, an awaiting authorization action, awaiting instruction action, or an authorization action. In various embodiments, the processing module 120 assigns an order identifier to the message. Here, the order identifier can be represented as a timestamp corresponding to when the step of the processing task was performed. Generally, the order identifier enables the message to be appropriately ordered in relation to other messages generated by the processing module 120. In various embodiments, the processing module 120 assigns a carry forward identifier to the message. The carry forward identifier is a value that enables compilation of messages that are related to one processing task that is performed across different processing task processing applications 110. Therefore, as a processing task is passed from a first processing task processing application 110 to a second processing task processing application 110, the messages generated by the first and second processing task processing applications as a result of performing steps of the processing task can have the same carry forward identifier. In some embodiments, a generated message can include one, two, three, or all four of the identifiers (e.g., linkage identifier, action identifier, order identifier, and carry forward identifier).

In various embodiments, processing task processing application 110A, 110B, and 110C generates a message according to a configuration specific to a processing task processing application. Therefore, messages generated by processing task processing applications 110 may have different configurations, hereafter referred to as schemas. A schema of a message refers to the organization of data values in the message. As an example, the schema of a message generated by a first processing task processing application 110 can describe that a first data value that represents a linkage identifier is located in a first column, a second data value that represents an action identifier is located in a second column, and a third data value that represents payload information is located in a third column. The schema of a message generated by a second processing task processing application 110 can describe that payload information is located in a first column, a first identifier is in a second column, and a second identifier is in a third column. Thus, different messages generated by different processing task processing applications 110 may have different schemas that are particular to a processing task processing application 110.

The processing module 120 places generated messages in a message queue 125 of the processing task processing application 110. Generally, a message queue 125 is a database that holds messages generated by processing task processing applications 110. Although FIG. 1 depicts three separate message queues 125A, 125B, 125C that are each in an individual processing task processing application 110, in some embodiments, the system environment 100 may include a single message queue 125 that queues messages from processing modules 120A, 120B, and 120C.

After the processing module 120 performs steps for a processing task, the processing task enters into a particular state. For example, a processing task state can indicate that the processing task is pending authorization, is approved, is awaiting feedback, is blocked pending availability of a resource, is settled, is completed, or is canceled. In some embodiments, a processing task exception may occur. A processing task exception can refer to a processing task error. A processing task error refers to an unexpected break in a processing task. As one example, a processing task error can occur as a processing task is passed from a first processing task processing application 110 to a second processing task processing application 110. For example, if the second processing task processing application 110 does not receive a processing task that was passed along by the first processing task processing application, then a processing task exception occurs. As another example, a processing task exception occurs while a processing module 120 is performing multiple steps of a processing task. For example, if the processing module 120 of the processing task processing application 110 has been performing a particular step of the processing task for an amount of time that is significantly more than the historical average processing time for that particular step, then a processing task exception occurs. As described in further detail below, the tracking system 160 monitors the processing tasks for processing task exceptions which may be due to a fault in an application, a computer system executing the application, or due to another issue.

Figure 2A:
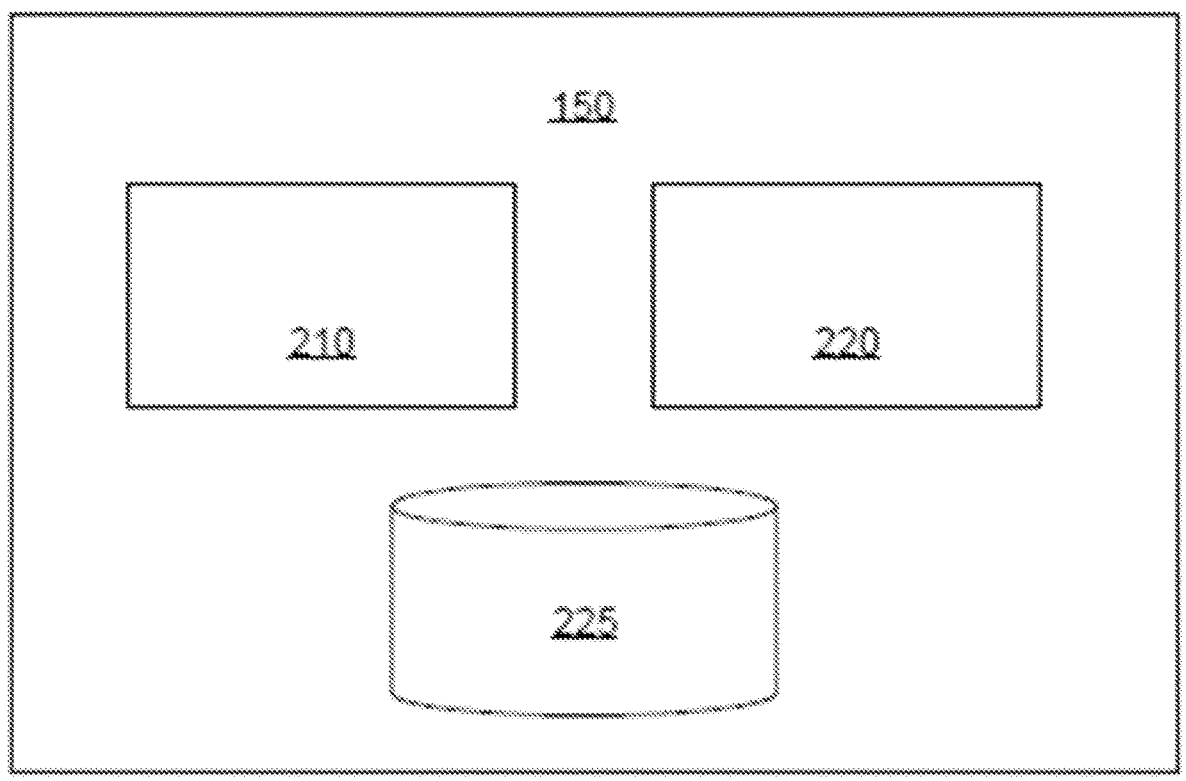
FIG. 2A depicts an example block diagram of a result system, in accordance with an embodiment.

The result system 150 accesses messages from message queues 125 and generates results for messages. FIG. 2A depicts an example block diagram of a result system 150, in accordance with an embodiment. Here, the result system 150 can include a message organization module 210 and a result generation module 220. For example, result system 150 may be used to generate for display, in a user interface, a graphical representation of the first portion of the dynamically selected sequence.

The message organization module 210 monitors the message queues 125 of the processing task processing applications 110, accesses newly generated messages in the message queues 125, and organizes the messages according to one or more identifiers (e.g., linkage identifier, action identifier, order identifier, or carry forward identifier) that are included in the messages. The message organization module 210 generates sets of messages, where each set includes messages that correspond to a particular processing task. Additionally, the message organization module 210 orders the messages in the set according to, for example, an order in which the steps of the processing task were performed. The message organization module 210 can then provide the sets of messages to the result generation module 220.

To generate a set of messages, the message organization module 210 parses the message queues 125 for messages that have been generated as a result of a performed step of the particular processing task. More specifically, the message organization module 210 searches the message queues 125 for messages that include a particular linkage identifier and/or a particular carry forward identifier that represent the processing task.

In various embodiments, the message organization module 210 identifies messages that correspond to a processing task through a multi-step approach. First, the message organization module 210 identifies messages generated by a single processing task processing application 110 by identifying messages that include a common linkage identifier that was assigned to messages by the processing task processing application 110. Next, the message organization module 210 identifies messages corresponding to the processing task that have been generated by other processing task processing applications 110 by using the carry forward identifier in the identified messages. The message organization module 210 uses the linkage identifier in identified messages that have been generated by other processing task processing applications 110 to identify additional messages generated by other processing applications 110.

To provide an example, referring to FIG. 1, the message organization module 210 can access a first message from message queue 125A and then parses the message queue 125A for other messages that have the same linkage identifier. Thus, the message organization module 210 can identify messages derived from steps of a processing task that have been performed by processing task processing application 110A. The message organization module 210 extracts the carry forward identifier from these identified messages generated by the processing task processing application 110A and then parses the message queues 125 (e.g., message queues 125B and 125C) of other processing task processing applications 110B and 110C to identify messages that include a matching carry forward identifier. These additional identified messages represent messages generated by the other processing task processing applications 110B and 110C that also correspond to performed steps of the same processing task.

In some embodiments, not all messages that correspond to the processing task in message queues 125B and 125C include the matching carry forward identifier. Here, the message organization module 210 can access the linkage identifier of identified messages from the message queues 125B and 125C and further parses message queues 125B and 125C for additional messages that include a matching linkage identifier. The message organization module 210 compiles the identified messages generated by processing task processing application 110A and other processing task processing applications 110B and 110C. Thus, the message organization module 210 can identify a comprehensive list of messages from the message queues 125B and 125C that correspond to the same processing task.

The message organization module 210 can further filter and organize messages in each set of messages in message queues 125A, 125B, 125C based on the action identifier in each message. The message organization module 210 can filter messages in each set according to the action identifier in each message, and therefore, can isolate messages that correspond to performed steps of the processing task that are of a particular type. For example, the message organization module 210 can isolate messages that correspond to steps of a processing task which belong to a particular processing task type. An example processing task type can be a type of the processing task processing application 110 and/or a phase of a processing task that is performed. Thus, the message organization module 210 leverages the action identifier to action specific processing task types into the individual lineage blockchains.

The message organization module 210 can further organize messages in sets of messages based on the order identifier in messages. As described above, the order identifier in a message can be represented as a timestamp corresponding to when the step of the processing task was performed. Thus, the message organization module 210 can temporally order the messages in the set based on when the corresponding steps of the processing task were performed.

Generally, the result generation module 220 generates a set of results from the set of messages and stores the results in the result store 225. In various embodiments, the result generation module 220 generates a result for each message. In other words, there is a 1:1 correlation between each message and each result. The result generation module 220 generates results by converting the schema of different messages to a common schema. Put another way, the result generation module 220 normalizes the disparate schemas of messages generated by the different processing task processing applications 110 such that the generated results have a unified, common schema that can be more efficiently processed and stored. Thus, in various embodiments, a result may include the data values that were originally included in a message; however, the organization of the data values in the result differs from the organization of the data values in the message.

In various embodiments, the result generation module 220 performs and/or ensures the organization of the generated results. For example, the set of messages may be ordered (e.g., ordered according to the order identifiers of the messages in the set). Therefore, the result generation module 220 maintains the order of the results in the set of results. By doing so, the generated set of results represent the performed steps of a processing task across multiple processing task processing applications 110.

Although the subsequent description refers to converting the schema of a single message to a common schema, the description also applies to converting the schema of messages from a set and/or messages from different sets to a common schema. Generally, to convert the schema of a message, the result generation module 220 first determines the schema of the message generated by a processing task processing application and compares the determined schema of the message to a common schema.

Briefly, the result generation module 220 may identify attributes of data values within the message to determine the types of data values within the message. Attributes of a data value can be an object type of the data value (e.g., string, Boolean, number, integer, and the like) or other patterns of the data value (e.g., a number of digits in the data value, an estimated range of values for the data value, a format of the data value, a presence of unique symbols in the data value). To identify attributes for a data value in the message, the result generation module 220 may perform a pattern recognition on the data value. As one example, the result generation module 220 identifies a regular expression (regex) from the sequence of characters in the data value. A regular expression can be any pattern in the data value such as a particular format of a linkage identifier or a carry forward identifier. Therefore, an identified regular expression can serve as the extracted attributes of a data value and is then used to define the type of data values within the message. The particular organization of the types of data values within the message defines the schema of the message.

Given the schema of the message, the result generation module 220 determines how to convert the schema of the message to a common schema. For example, the result generation module 220 can determine that certain data values in the message are to be shifted, swapped, or altered in order to change the organization of the data values in the message to meet the organization of data values in the common schema. To provide an example, a schema of a message generated by a processing task processing application 110 can be determined to be:

Schema={Payload, Linking ID, Action ID, Order ID, Carry Forward ID}

On the other hand, the common schema can be arranged as:

Common Schema={Linking ID, Action ID, Payload, Order ID, Carry Forward ID}.

In this scenario, the result generation module 220 can convert the schema of the message from the processing task processing application 110 by moving the "Payload" data value(s) into the third position and by shifting the "Linking ID" and "Action ID" into the first and second positions, respectively.

Thus, the result generation module 220 generates results that include data values that are organized according to the common schema and stores the results in the result store 225. The result store 225 is a database that holds the results. The results can be subsequently accessed from the result store 225 for storing in a blockchain, as is described in further detail below.

Tracking System 160

The tracking system 160 tracks states of the processing tasks executed by the processing task processing applications 110, validates results of processing tasks within a blockchain, and recovers processing tasks that have experienced processing task exceptions. More specifically, the tracking system 160 maintains a master blockchain that includes blocks of results representing steps of various processing tasks performed by the processing task processing applications 110. Furthermore, the tracking system 160 maintains separate lineage blockchains that each include blocks of results that represent performed steps of an individual processing task. The tracking system 160 can identify processing task exceptions by monitoring results within lineage blockchains. The tracking system 160 can further verify that a processing task has not been inappropriately altered (e.g., hacked) by validating the block hash values of the lineage blockchain for the processing task and/or the master blockchain. Once the processing task is validated, the tracking system 160 can trigger a recovery process to address the processing task exception.

Figure 2B:
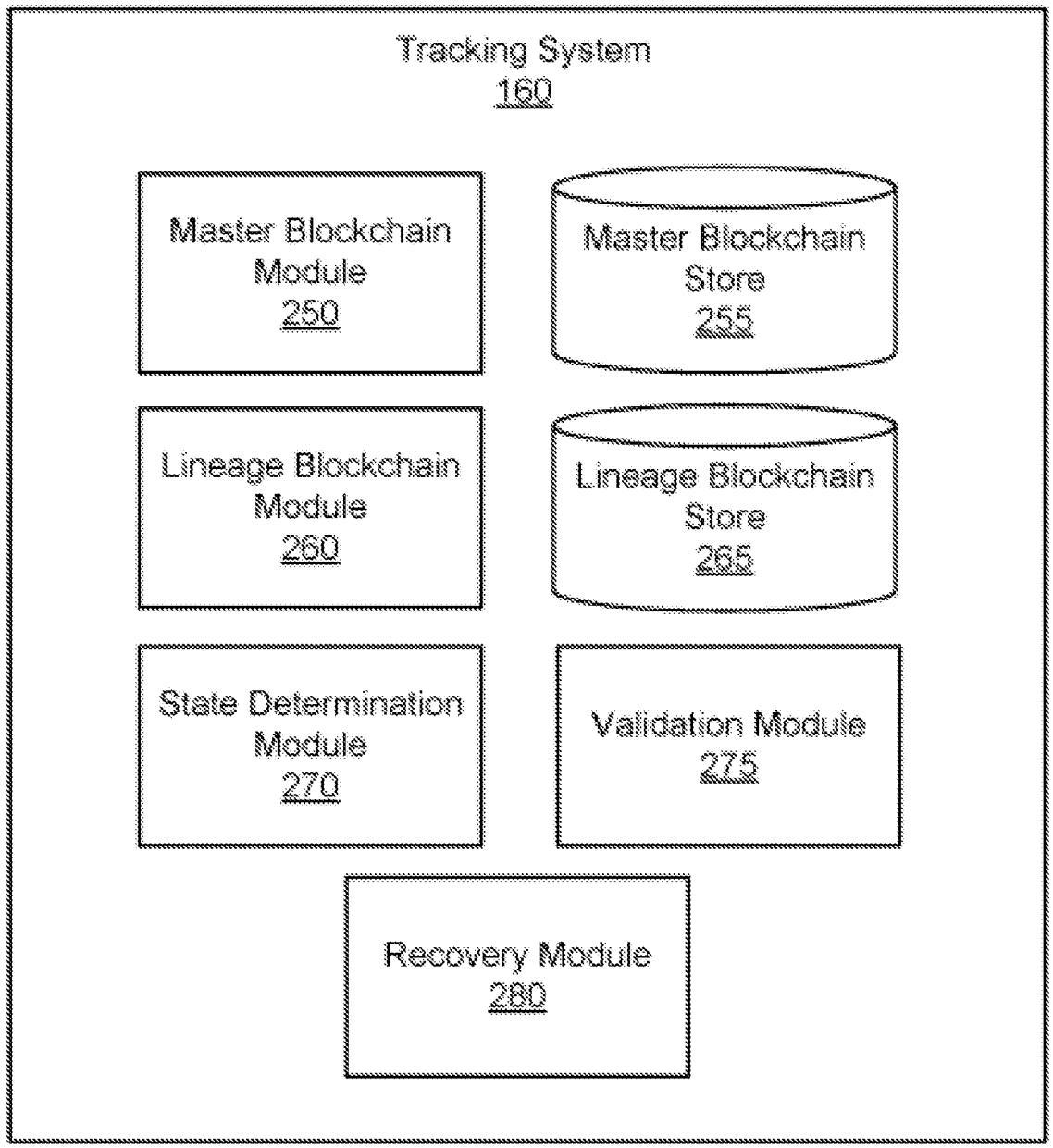
FIG. 2B depicts an example block diagram of a tracking system, in accordance with an embodiment.

FIG. 2B depicts an example block diagram of a tracking system 160, in accordance with an embodiment. For example, tracking system 160 may be used to record in all subsequent results and time stamps of respective processing tasks of a plurality of the respective processing tasks when completing a serial processing of a request comprises performing a plurality of respective processing tasks in a dynamically selected sequence. As shown in FIG. 2B, the tracking system 160 includes a master blockchain module 250, a lineage blockchain module 260, a state determination module 270, a validation module 275, a recovery module 280, a master blockchain store 255, and a lineage blockchain store 265. In other embodiments, the tracking system 160 can include additional or fewer modules or stores. For example, in some embodiments, the tracking system 160 need not include the lineage blockchain store 265 for storing lineage blockchains.

The master blockchain module 250 accesses results stored in the result store 225 of the result system 150 and writes results to blocks in a master blockchain. Generally, the master blockchain module 250 accesses results irrespective of the processing task to which the results correspond. In other words, the master blockchain includes results corresponding to all processing tasks executed by the processing task processing applications 110. The master blockchain module 250 stores the master blockchain in the master blockchain store 255.

In various embodiments, the master blockchain module 250 generates a block of results based on a particular time period (e.g., a block includes results that were generated within a span of N minutes). For example, the master blockchain module 250 accesses results that were stored in the result store 225 within a time period and generates a first block in the master blockchain that includes the results. Next, the master blockchain module 250 accesses additional results that were stored in the result store 225 within a next time period and generates a second block that includes the additional results. The second block is written adjacent to the first block in the master blockchain.

In various embodiments, the master blockchain module 250 generates blocks of results based on a number of results (e.g., a block is generated for every N results). As an example, the master blockchain module 250 accesses a first N results and generates the first block in the blockchain that includes the first N results. Next, the master blockchain module 250 accesses the next N results and generates the next, adjacent block in the blockchain that includes the next N results. The master blockchain module 250 continues to repeat this process for subsequent results to build the master blockchain.

Figure 3:
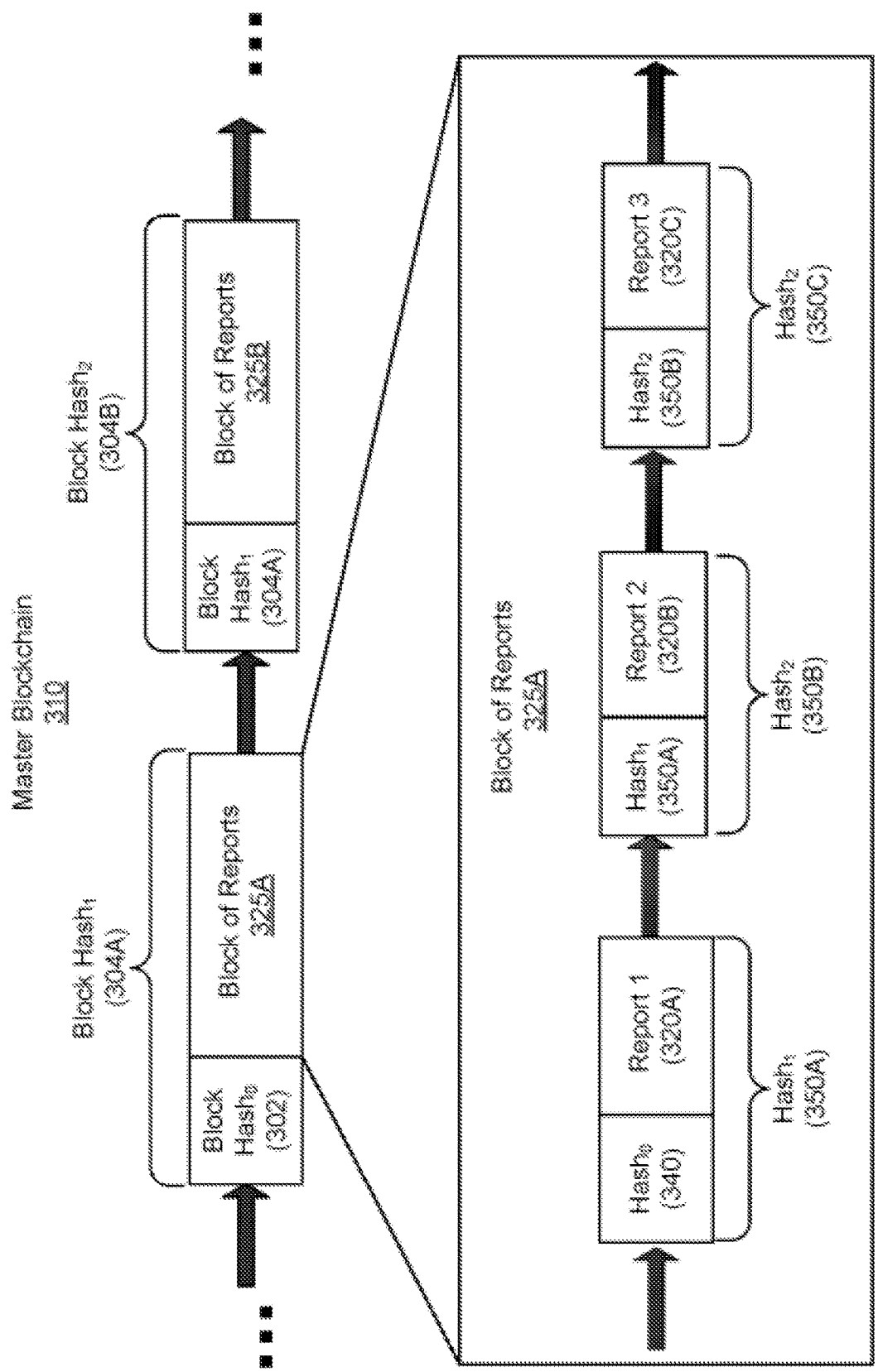
FIG. 3 depicts an example master blockchain that includes blocks of results, in accordance with an embodiment.

Reference is now made to FIG. 3, which depicts an example master blockchain 310 that includes blocks of results 325, in accordance with an embodiment. For example, master blockchain 310 may represent a component used for improving hardware resiliency during serial processing tasks in distributed computer networks. For example, master blockchain 310 may be used to record in all subsequent results and time stamps of respective processing tasks of a plurality of the respective processing tasks when completing a serial processing of a request comprises performing a plurality of respective processing tasks in a dynamically selected sequence.

The master blockchain 310 includes multiple blocks of results 325 that are immutably linked. In various embodiments, a block of results includes a block hash (e.g., a hash value) of the prior block in the master blockchain, thereby ensuring the immutability of the master blockchain.

To generate immutably linked blocks of results, the master blockchain module 250 combines a block of results with a header. The header includes a hash that represents the immediately preceding block. The master blockchain module 250 performs a hash of the combined header and block of results. In various embodiments, the master blockchain module 250 performs one of a message digest algorithm 5 (MD5), a secure hash algorithm (SHA) (e.g., SHA-0, SHA-1, SHA-2, or SHA-3), BLAKE, or other hash functions of the like. The master blockchain module 250 includes the hash of the combined header and block as a subsequent header. The master blockchain module 250 can repeat this process to continue to build the master blockchain 310.

Referring specifically to FIG. 3, the master blockchain module 250 combines block of results 325A with a header that is represented by a block hash value (e.g., block hash0 302). The master blockchain module 250 generates a block hash1 304A by hashing the combined block hash0 302 and block of results 325A. The master blockchain module 250 includes the generated block hash1 304A in a subsequent header and combines the block hash1 304A with the subsequent block of results 325B. The master blockchain module 250 generates block hash2 304B by hashing the combined block hash1 304A and block of results 325B and continues to process to build the master blockchain 310.

In various embodiments, a block of results 325 includes results that are additionally immutably linked. The master blockchain module 250 can combine a result with a hash value that represents the immediately preceding result. The master blockchain module 250 can generate a hash value of the combined result and hash value. The master blockchain module 250 then combines the generated hash value with the next result and repeats this process for the next result to continue to build a block of results. By immutably linking individual results within a block of results 325, the master blockchain module 250 can leverage the immutability of the master blockchain and detect erroneous or malicious activity at the level of individual results.

Referring specifically to FIG. 3, result 1 (320A) is combined with a header that is represented by a hash value (e.g., hash0 340). For example, result 1 (320A) is appended to hash0 340. The master blockchain module 250 performs a hash of the hash0 340 and result 1 (320A) to generate hash1 350A. The master blockchain module 250 appends a subsequent result (e.g., result 2 (320B)) to the hash of the prior result (e.g., hash1 350A). The master blockchain module 250 generates hash2 (350B) by hashing the combination of hash1 350A and result 2 (320B). The master blockchain module 250 repeats the process for result 3 (320C).

In various embodiments, the master blockchain module 250 includes results 320 in a block of results 325 and need not immutably link the results 320 in a blockchain. For example, referring to FIG. 3, a block of results 325A can include result 1 (320A), result 2 (320B), and result 3 (320C) without the corresponding hashes (e.g., hash0 (340), hash1 (350A), hash2 (350B), and hash3 (350C)). Thus, in these embodiments, the master blockchain 310 can include blocks of results 325 that are immutably linked through block hash values, but the individual results 320 of blocks 325 need not be immutably linked.

Returning to FIG. 2B, the master blockchain store 255 holds the master blockchain 310. Given that the master blockchain 310 includes blocks of results that correspond to all processing tasks executed by the processing task processing applications 110, the master blockchain store 255 holds one copy of the master blockchain 310. The master blockchain store 255 persistently holds the master blockchain 310 so that the immutably linked blocks of results are available for access when needed.

The lineage blockchain module 260 generates lineage blockchains that are specific for a processing task. Given that a lineage blockchain corresponds to the sequence of steps comprising a specific processing task, the results included in the lineage blockchain enable the tracking of the state of the processing task. Generally, the blocks of the lineage blockchain are immutably linked to ensure the validity of the results of the lineage blockchain. The implementation of lineage blockchains is advantageous as the tracking system 160 can quickly determine states of different processing tasks, and recover from any errors, by accessing the lineage blockchains as opposed to having to access and parse results of different processing tasks in the master blockchain.

In various embodiments, to generate a block of results in a lineage blockchain, the lineage blockchain module 260 accesses sets of results that correspond to a particular processing task (i.e., the results of the last processing task and all previous processing tasks). As one example, the lineage blockchain module 260 identifies the appropriate set of results to be assembled into a lineage blockchain by matching the linkage identifier or carry forward identifier included in results to a corresponding linkage identifier or carry forward identifier included in results of particular locations in the master Blockchain corresponding to the steps of the particular processing task.

In various embodiments, the lineage blockchain module 260 identifies results that are to be included in a block of a lineage blockchain by parsing results included in the master blockchain for results that are specific for a processing task. In various embodiments, the lineage blockchain module 260 identifies results in the master blockchain 310 that are specific for a particular processing task based on an identifier, such as the linkage identifier and/or carry forward identifier, included in the results. In various embodiments, the lineage blockchain module 260 begins at the genesis block of the master blockchain 310 and proceeds along the master blockchain 310 to identify results in the master blockchain 310 that include a particular linkage identifier and/or a carry forward identifier.

Figure 4:
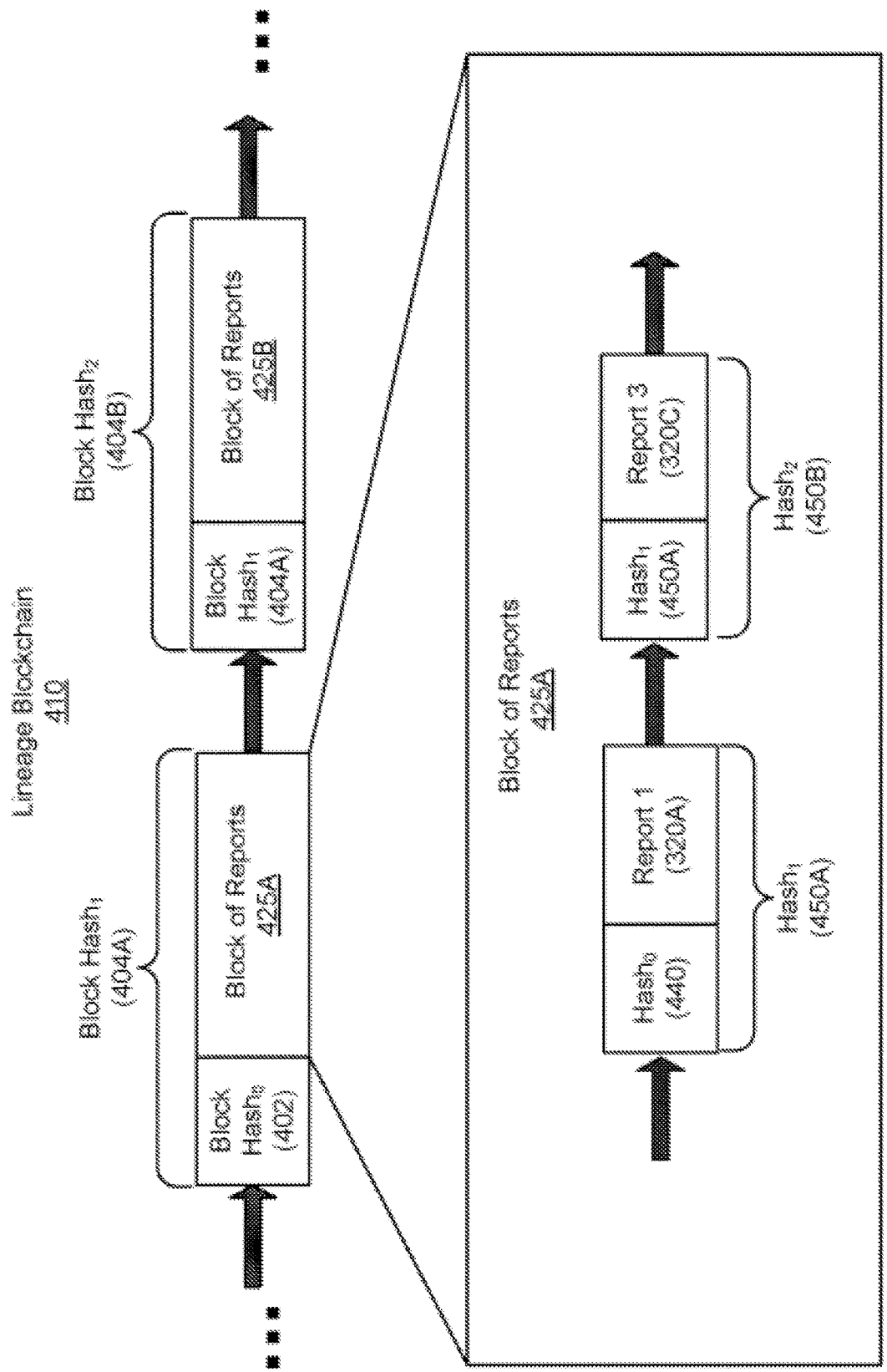
FIG. 4 depicts an example lineage blockchain that includes blocks of results that are specific for a processing task, in accordance with an embodiment.

Reference is now made to FIG. 4, which depicts an example lineage blockchain 410 that includes blocks of results 425 that are specific for a processing task, in accordance with an embodiment. The lineage blockchain 410 includes multiple blocks of results 425 that are immutably linked. In various embodiments, a block in the lineage blockchain 410 includes a block hash (e.g., a hash value) of the prior block in the lineage blockchain 410, thereby ensuring the immutability of the lineage blockchain 410.

The lineage blockchain 410 shown in FIG. 4 differs from the master blockchain 310 shown in FIG. 3 in that the lineage blockchain 410 includes a subset of results included in the master blockchain 410 organized into the order corresponding to the steps of a specific processing task. Here, the ordered subset of results corresponds to a processing task. For example, assume that result 1 (320A) and result 3 (320C) that were included in the master blockchain 310 (see FIG. 3) are results that correspond to a particular processing task whereas result 2 (320B) corresponds to a different processing task. Thus, the lineage blockchain module 260 includes result 1 (320A) and result 3 (320C) within a block of results 425A of the lineage blockchain 410 (see FIG. 4) that is specific for the same processing task but does not include result 2 (320B) in the lineage blockchain 410.

The lineage blockchain module 260 may generate immutably linked blocks of results in the lineage blockchain 410 using methods described above in relation to the master blockchain module 250 for generating the master blockchain 310. For example, the lineage blockchain module 260 performs hashes (e.g., one of a MD5, SHA or other hash function) of the header and block of results 425 and includes the hash as a header of a subsequent block to immutably link the blocks. Additionally, the lineage blockchain module 260 can similarly generate blocks based on a particular time (e.g., e.g., a block includes results of a particular processing task that were generated within a span of N minutes) or based on a number of results (e.g., a block is generated for every N results of a particular processing task).

In various embodiments, the lineage blockchain module 260 orders the results in each block of the lineage blockchain. For example, the lineage blockchain module 260 uses the time that the results were generated to order the results of the lineage blockchain to correspond to the steps of the processing task. Therefore, the results in each block of the lineage blockchain are chronologically organized. As another example, the lineage blockchain module 260 categorizes the results by the entity or the system that has processed the processing task and orders the results according to the categories. Therefore, a first set of results in a block of the lineage blockchain can correspond to steps of a processing task performed by a first entity, which is subsequently followed by a second set of results in the block of the lineage blockchain that correspond to steps of the processing task performed by a second entity and the previous transactions. The resulting lineage blockchain can thus be used to identify the point in the sequence of steps in the processing task at which the exception has occurred and can serve as a means of initiating a recovery process, ultimately assisting in completion of the processing task.

In various embodiments, the lineage blockchain module 260 generates blocks of results 425 that includes results that are also immutably linked. For example, referring to FIG. 4, the lineage blockchain module 260 can combine result 1 (320A) with a header that is represented by a hash value (e.g., hash0 440). The lineage blockchain module 260 performs a hash of the hash0 440 and result 1 (320A) to generate hash1 450A. The lineage blockchain module 260 appends the subsequent result (e.g., result 3 (320C)) to the hash of the prior result (e.g., hash1 450A). The lineage blockchain module 260 generates hash2 (450B) by hashing the combination of hash1 450A and result 3 (320C). Thus, the lineage blockchain module 260 generates a block of results 425A that includes results that are immutably linked in the sequential order in which they were generated.

In various embodiments, the lineage blockchain module 260 need not immutably link the results 320A and 320C in a block of results 425 of the lineage blockchain 410. For example, referring to FIG. 4, a block of results 425A can include result 1 (320A) and result 3 (320C) without the corresponding hashes (e.g., hash0 (440), hash1 (450A), and hash2 (450B)). Thus, in these embodiments, the lineage blockchain 410 can include blocks of results 425 that are immutably linked through block hash values, but the individual results 320A and 320C of the block of results 425 need not be immutably linked.

The lineage blockchain store 265 holds lineage blockchains 410 generated by the lineage blockchain module 260. In various embodiments, as the processing task processing applications 110 execute processing tasks, the lineage blockchain store 265 holds lineage blockchains 410 corresponding to the currently executing processing tasks. In various embodiments, the lineage blockchain store 265 can remove a lineage blockchain 410 that need not be persistently stored in memory. For example, once a processing task completes, the lineage blockchain 410 for the processing task can be removed. In an embodiment, the lineage blockchain store 265 removes a lineage blockchain 410 from memory after a threshold amount of time. In other words, a lineage blockchain 410 can expire and be removed from the lineage blockchain store 265 after passage of the threshold amount of time. The threshold amount of time may be dependent on (e.g., measured from) when the processing task enters into a state that indicates that the processing task has completed.

The state determination module 270 periodically checks for states of processing tasks and determines whether a processing task is in a state that indicates that a processing task exception has occurred. The state determination module 270 determines the state of a processing task by accessing a lineage blockchain specific for the processing task. In various embodiments, the state determination module 270 investigates the results in the final block in the lineage blockchain. Specifically, the state determination module 270 can access the final result (e.g., final result based on the order identifier included in the result) in the final block in the lineage blockchain and determine whether the final result indicates that the processing task is in a terminated state. A terminated state indicates that the processing task has been completed. Examples of a terminated state for a processing task can include a "settled" state or a "cancelled" state. If the state determination module 270 determines that the final result indicates that the processing task is in a terminated state, then the processing task can be deemed complete.

If the state determination module 270 determines that the final result indicates a mid-processing state and does not indicate an expected terminated state, the state determination module 270 determines whether a processing task exception has occurred by querying the order identifier in the final result. Specifically, the state determination module 270 compares the order identifier in the final result, which represents a timestamp when the last step of the processing task was performed, to a current time to determine whether greater than a threshold amount of time has passed since the last step of the processing task was performed. In one embodiment, the threshold amount of time is a historical average processing time (e.g., average across prior processing tasks) for the last step. In some embodiments, the threshold amount of time is a fixed value, such as 60 seconds, 5 minutes, 10 minutes, 1 hour, and the like.

When the state determination module 270 determines that greater than a threshold amount of time has passed since the performance of the last step of the processing task, the state determination module 270 determines that the processing task has been stopped in mid-processing and therefore, a processing task exception has occurred. The state determination module 270 can provide the current state of the processing task to the recovery module 280.

In various embodiments, the state determination module 270 can predict upcoming problems based on the detected processing task exceptions. Therefore, the state determination module 270 can notify the recovery module 280 to initiate recovery processes before the processing task exceptions develop into more severe and widespread problems. For example, the state determination module 270 can determine that above a threshold number of processing tasks, whose steps are being performed by a specific processing task processing application 110, are experiencing processing task exceptions. Thus, the state determination module 270 can determine that the specific processing task processing application 110 may be experiencing an outage. The state determination module 270 can provide a notification to the recovery module 280 to initiate the recovery process for the processing tasks and to ensure that additional processing tasks being processed by the specific processing task processing application 110 do not experience processing task exceptions.

In various embodiments, the state determination module 270 checks for states of processing tasks by periodically accessing lineage blockchains to continually ensure that processing tasks are being appropriately processed. For example, the state determination module 270 may check lineage blockchains every X seconds, minutes, or hours to ensure that processing task exceptions have not occurred.

The validation module 275 performs a validation process to ensure that the determined state of the processing task is valid. By validating the processing task, the validation module 275 ensures that the processing task exception that has occurred did not arise due to an inappropriate tampering of the processing task. The validation module 275 accesses the lineage blockchain for the processing task and investigates the block hash values to ensure that the results included in the lineage blockchain specific for the processing task have not been altered. For example, the validation module 275 accesses the block hash value representing the genesis block of the lineage blockchain, then checks that the block hash value matches the block hash included in the header of the subsequent adjacent block of the lineage blockchain. The validation module 275 can repeat this process for subsequent block hash values in the lineage and so on. If the validation module 275 identifies that any of the block hash values do not align with a hash value in a header of a subsequent block, the validation module 275 can deem the processing task as invalid. Appropriate action can be taken to remove the invalid processing task. Alternatively, if the validation module 275 successfully matches each block hash value to a hash value in a header of a subsequent block, the validation module 275 can deem the processing task to be valid and can provide the determined state of the processing task to the recovery module 280 to initiate the recovery process.

In various embodiments, when the validation module 275 determines that a processing task exception has occurred for a processing task, the validation module 275 can determine how the processing task exception affects the parties involved in the processing task. The validation module 275 may determine how the parties are affected while performing the validation of the processing task. For example, as the validation module 275 sequentially validates each block hash value of each block in the lineage blockchain, the validation module 275 can track how the parties involved in the processing task are affected based on the results in each block. In some embodiments, the determined effects of the processing task exception on the parties can be presented to the parties for remedial or informative purposes.

The recovery module 280 can generate an alert that identifies the processing task exception, logs the alert, and can further initiate a recovery process to address the processing task exception. In one embodiment, the recovery module 280 sends a request to the processing task processing application 110 where the processing task exception has occurred to continue the remaining steps of the processing task. Here, the request can include one or more identifiers that enable the processing task processing application 110 to identify the step of the processing task during which the processing task exception has occurred. For example, the request can include the linkage identifier and the action identifier included in the result.

In some embodiments, the recovery module 280 can initiate a recovery process through alternative systems to ensure that the alternative systems can resolve the processing task exception by performing the remaining steps of the processing task. This may be beneficial in scenarios where the processing task exception arose because of an unexpected malfunction of the processing task processing application 110 (e.g., the processing task processing application 110 is experiencing an outage). Alternative systems may be third party systems not affiliated with the tracking system 160.

In some embodiments, the initiation of a recovery process for a processing task further involves the recovery module 280 providing the lineage blockchain specific for the processing task to the processing task processing application 110 or to the alternative system. Thus, the processing task processing application 110 or the alternative system can use the lineage blockchain to further establish the validity of the processing task.

In some embodiments, the recovery module 280 can initiate a recovery process that requires input from one or more users. For example, each of one or more users can provide approval at various stages of the remaining steps of the processing task. Requiring input from multiple users can ensure the validity of the recovery process as the remaining steps of the processing task are performed.

The recovery module 280 can notify the state determination module 270 of the recovery process for a particular processing task. Therefore, the state determination module 270 can periodically check the lineage blockchain of the particular processing task to determine whether an updated state of the processing task indicates that the processing task has been recovered and/or completed.

Figure 5:
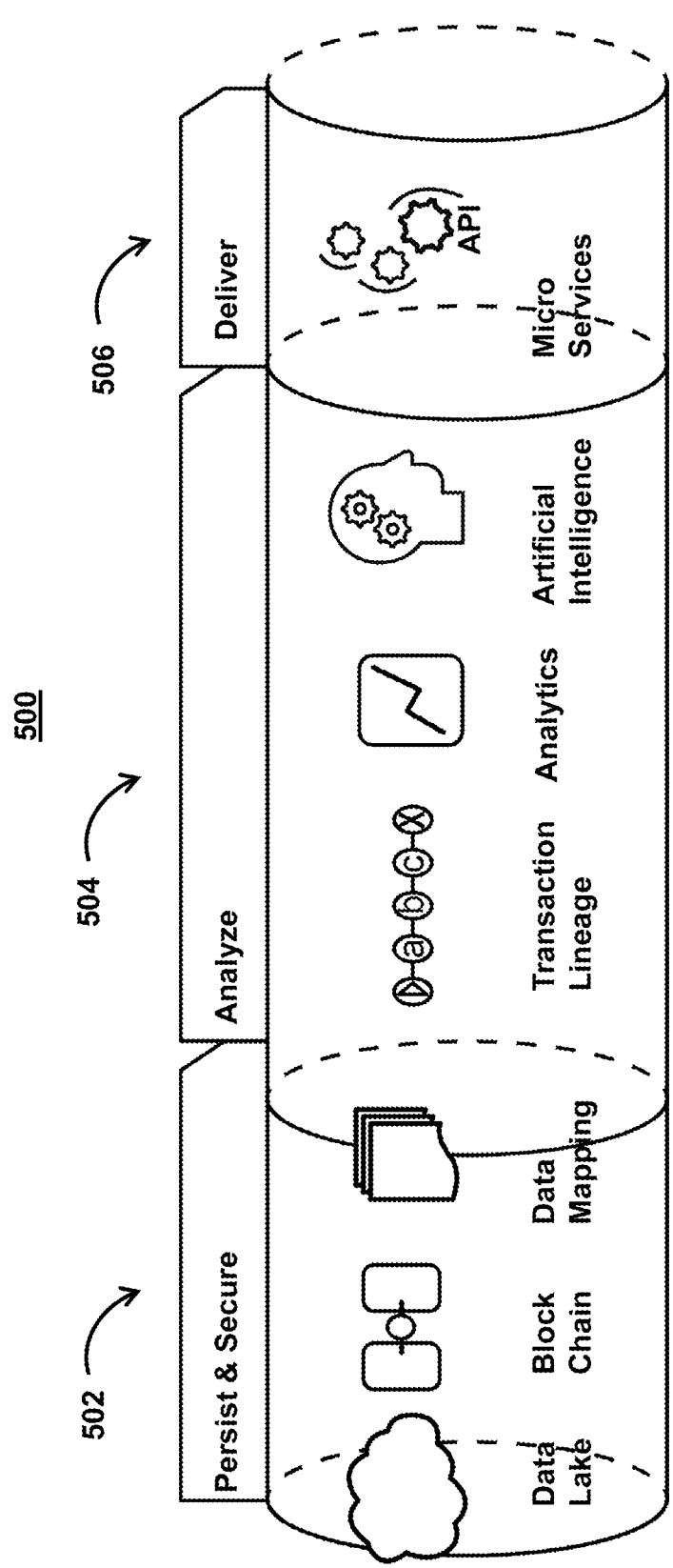
FIG. 5 depicts an illustrative diagram of an intelligent system for improving hardware resiliency during serial processing tasks in distributed computer networks, in accordance with an embodiment.

FIG. 5 depicts an illustrative diagram of an intelligent system for improving hardware resiliency during serial processing tasks in distributed computer networks, in accordance with an embodiment. For example, diagram 500 presents an illustrative diagram of how the systems described herein improve hardware resiliency during serial processing tasks in distributed computer networks. For example, in some embodiments the system may relate to centralized processing of financial transactions such payments, securities, advices, statements, etc. For example, each request as described herein may refer to an individual financial transaction. Each of the processing tasks may correspond to one or more tasks (e.g., verifying instructions, clearing payments, transferring money, etc.) that must be undertaken by a given application in order to complete the financial transaction. The system uses a combination of block chain technology, highly resilient, and highly scalable messaging technologies and a high performance search technology to provide the improvement in hardware resiliency. Additionally, the system may normalize all financial transactions into a single canonical schema (e.g., a network-specific schema) and enable real-time tracking, real-time fault identification, real-time analysis and real-time recovery of faulty transactions using non-repudiable information captured on block chains (e.g., a request identifier in results of the various processing tasks).

For example, financial transactions are often processed by varying computing systems using disparate technologies (e.g., portion 502). For example, to fulfill a transaction, a host of applications may perform multiple steps to initiate transactions, a second set of applications may perform a series of steps to obtain approval for the transactions, and a third set of systems may perform yet another set of steps to result the transaction. Transactions may be fulfilled and completed, though in some circumstances, transaction faults may occur. Transaction faults may arise due to technology issues (e.g., an application fails) or due to operational inefficiencies (e.g., improper entry of client details) or in some serious cases due to external interference (e.g., cyber-attacks leading to corruption of systems).

Therefore, identifying transactions that have been affected by such errors or faults is important for ensuring that transactions are appropriately completed and business is not interrupted. The system achieves this by analyzing all tasks currently being processed (e.g., at portion 504). If these faults are detected, the system may be alerted to them as described herein thus avoiding and/or mitigating hardware failures (e.g., a system crash). Additionally, as an entire transaction history is stored in each result, the system may recover prior the history (or lineage) of the transaction from any of the results.

To enable this, the system utilizes the request identifiers (formatted in the network specific schema) to search for tasks corresponding to a given business transaction (e.g., a given request). The system may generate a mapping of a sequence of processing tasks that have thus occurred for the given business transaction (e.g., the given request). As the route and sequence of tasks that the given business transaction (e.g., the given request) is unknown at the submission of the given business transaction (e.g., the given request) to the system due to the complexity, the system may determine and predict this route using machine learning models (e.g., at portion 504).

The system may then provide various services based on the determined and/or predicted route as well as the status of the application in the route (e.g., at portion 506). For example, the system may determine a subset of the plurality of applications that correspond to a second portion of a series of tasks (e.g., a portion of tasks not yet performed) and verify a status of each of the plurality of applications of the subset. The system may then generate for display, in a user interface (e.g., user interface 700 and 800), a status update for each of the plurality of applications of the sub set.

Figure 6:
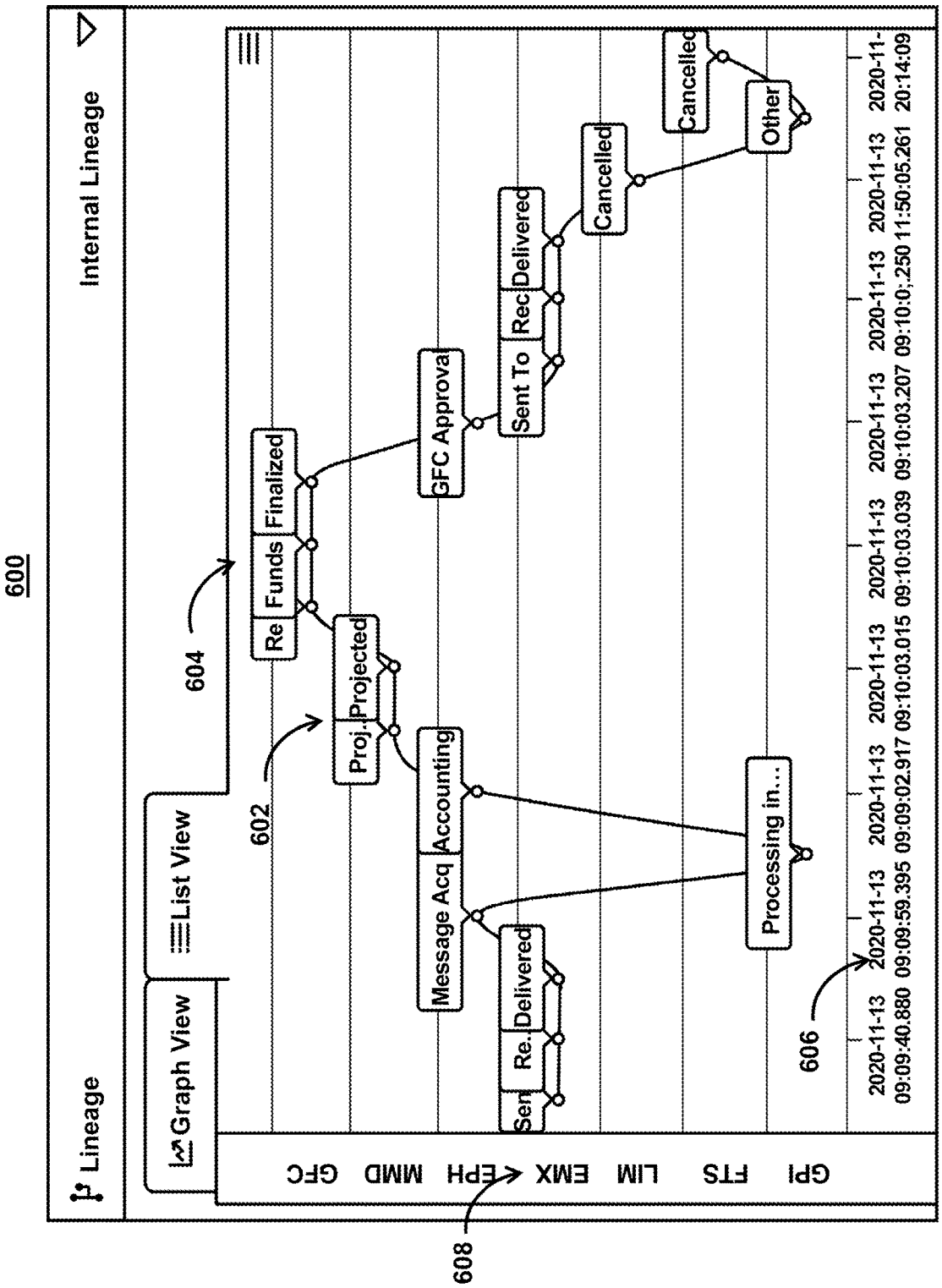
FIG. 6 depicts an illustrative user interface of an intelligent system for improving hardware resiliency during serial processing tasks in distributed computer networks, in accordance with an embodiment.

FIG. 6 depicts an illustrative user interface of an intelligent system for improving hardware resiliency during serial processing tasks in distributed computer networks, in accordance with an embodiment. For example, user interface 600 presents an illustrative user interface that provides data that improve hardware resiliency during serial processing tasks in distributed computer networks.

For example, user interface 600 may allow any line of business within a financial institution to be able to monitor the status of a business transaction (e.g., a request) end-to-end as the business transaction (e.g., the request) are processed through multiple applications and be able to reconcile (e.g., identify a route connecting each task of the request) for every task of the business transaction (e.g., the request) with upstream and downstream computing systems and application.

Figure 7:
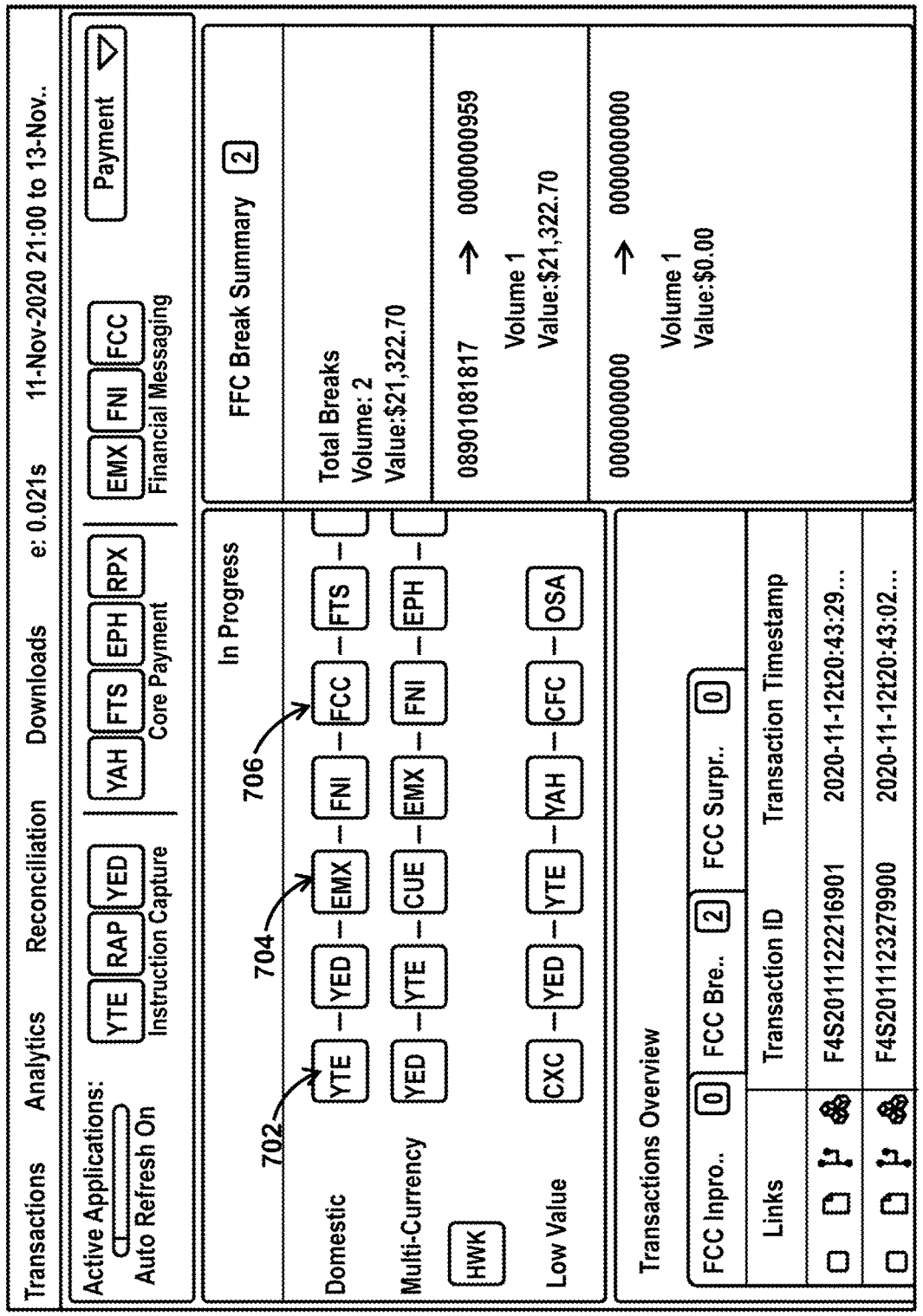
FIG. 7 depicts an illustrative user interface of an intelligent system for improving hardware resiliency during serial processing tasks in distributed computer networks, in accordance with an embodiment.

For example, user interface 600 may include a dynamically selected sequence indicating a processing task (e.g., tasks 602 and 604) for a request, an application (e.g., applications 608) that performed the processing task, a status of the processing task (e.g., pending, predicted, completed, failed, etc.), a time stamp for each task (e.g., time stamps 606), and other information about each task (e.g., as presented in FIG. 7).

By connecting to external utilities (e.g., financial market utilities) and processing clearing and settlement information for the business transaction (e.g., the request) as they are processed across other financial institutions, the system creates a seamless tracker of transactional information which provides a wealth of data to both internal operations as well as external entities.

For example, the system may identify where a business transaction (e.g., a request) is, in the transaction life cycle through a real time life cycle and lineage discovery. The system may store the life cycle/lineage on an immutable block chain data store as a non-repudiatory proof of transactional information (e.g., which may be accessed and/or recovered if there is a system failure). The system may transform all financial transactions into a "universal" or network specific schema rendering analytical interpretation and business intelligence across multiple lines of businesses. The system may also triage transaction delays/errors so they can be rerouted through alternate channels or alternate business transactions (e.g., requests), thereby avoiding processing interruptions.

FIG. 7 depicts an illustrative user interface of an intelligent system for improving hardware resiliency during serial processing tasks in distributed computer networks, in accordance with an embodiment. For example, user interface 700 presents an illustrative user interface that provides data that improve hardware resiliency during serial processing tasks in distributed computer networks.

For example, user interface 700 presents user information that provides status and other information about one or more business transactions (e.g., requests) and/or individual processing tasks. For example, user interface may show icons 702, 704, and 706, each of which corresponds to a different processing task in a lineage of a business transaction (e.g., a request) and/or the series of processing tasks for a business transaction (e.g., a request).

For example, as shown in user interface 700 (and user interface 600) the system may present graphical representations of status and other information about one or more business transactions (e.g., requests) and/or individual processing tasks. The system may thus allow multiple data centers to have the information stored in all events of all business transaction (e.g., a request) from across computing systems using the immutable blockchain database.

Figure 8:
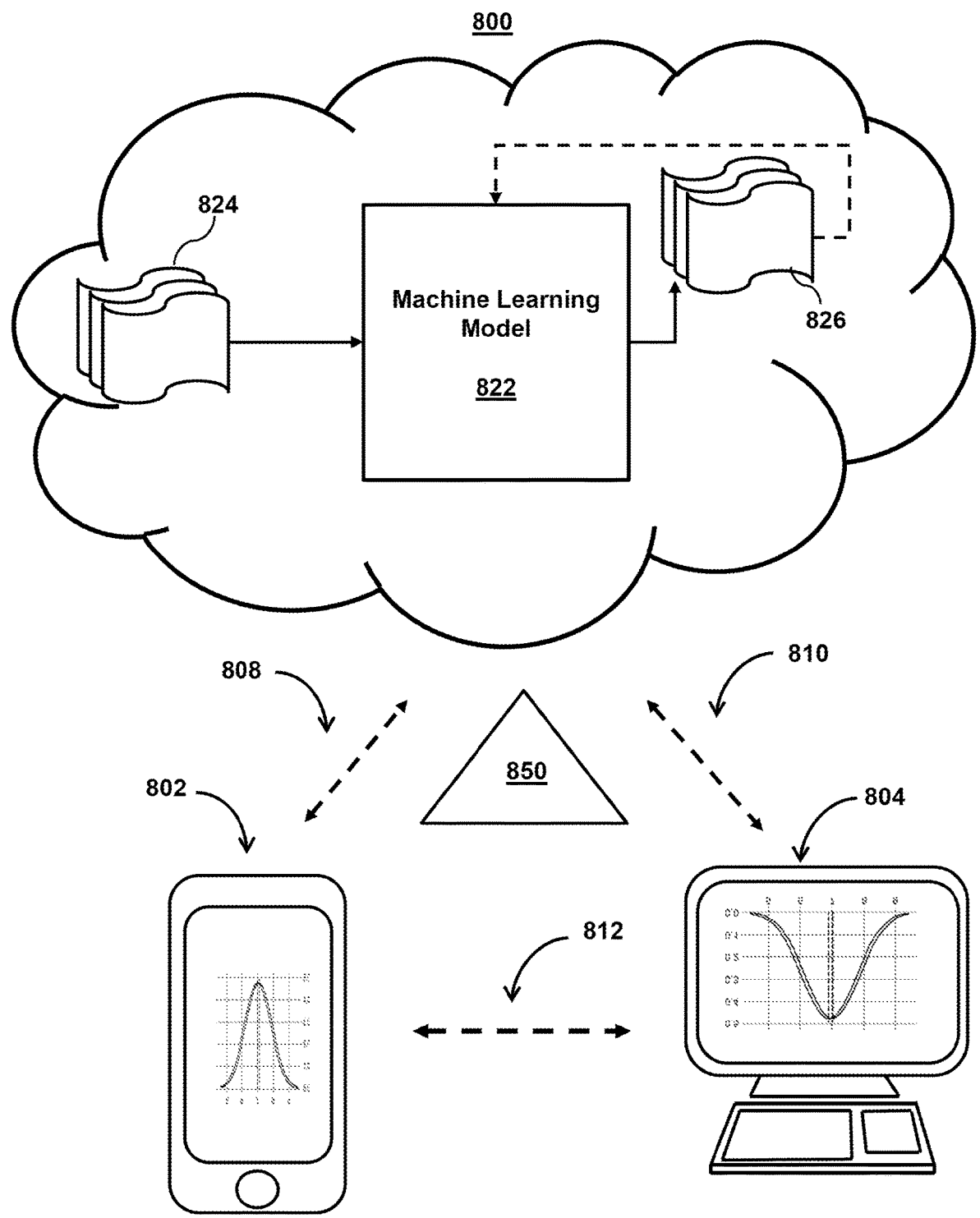
FIG. 8 depicts an illustrative system for an intelligent system for improving hardware resiliency during serial processing tasks in distributed computer networks, in accordance with an embodiment.

FIG. 8 depicts an illustrative system for an intelligent system for improving hardware resiliency during serial processing tasks in distributed computer networks, in accordance with an embodiment. For example, system 800 may represent the components used for improving hardware resiliency during serial processing tasks in distributed computer networks. As shown in FIG. 8, system 800 may include mobile device 822 and user terminal 824. While shown as a smartphone and personal computer, respectively, in FIG. 8, it should be noted that mobile device 822 and user terminal 824 may be any computing device, including, but not limited to, a laptop computer, a tablet computer, a hand-held computer, other computer equipment (e.g., a server), including "smart," wireless, wearable, and/or mobile devices. FIG. 8 also includes cloud components 810. Cloud components 810 may alternatively be any computing device as described above and may include any type of mobile terminal, fixed terminal, or other device. For example, cloud components 810 may be implemented as a cloud computing system and may feature one or more component devices. It should also be noted that system 800 is not limited to three devices. Users may, for instance, utilize one or more devices to interact with one another, one or more servers, or other components of system 800. It should be noted that, while one or more operations are described herein as being performed by particular components of system 800, those operations may, in some embodiments, be performed by other components of system 800. As an example, while one or more operations are described herein as being performed by components of mobile device 822, those operations may, in some embodiments, be performed by components of cloud components 810. In some embodiments, the various computers and systems described herein may include one or more computing devices that are programmed to perform the described functions. Additionally, or alternatively, multiple users may interact with system 800 and/or one or more components of system 800. For example, in one embodiment, a first user and a second user may interact with system 800 using two different components.

With respect to the components of mobile device 822, user terminal 824, and cloud components 810, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 8, both mobile device 822 and user terminal 824 include a display upon which to display data (e.g., as shown in FIGS. 7-8).

Additionally, as mobile device 822 and user terminal 824 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 800 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 8 also includes communication paths 828, 830, and 832. Communication paths 828, 830, and 832 may include the Internet, a mobile phone network, a mobile voice or data network (e.g., a 5G or LTE network), a cable network, a public switched telephone network, or other types of communications networks or combinations of communications networks. Communication paths 828, 830, and 832 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 810 may be a database configured to store user data for a user. For example, the database may include user data that the system has collected about the requests through prior requests, both actively and passively. Alternatively, or additionally, the system may act as a clearing house for multiple sources of information about requests and/or the sequence of processing tasks needed to complete them.

Cloud components 810 may include model 802, which may be a machine learning model. Model 802 may take inputs 804 and provide outputs 806. The inputs may include multiple datasets such as a training dataset and a test dataset. Each of the plurality of datasets (e.g., inputs 804) may include data subsets related to predicted processing tasks, dynamically selected sequence, etc. In some embodiments, outputs 806 may be fed back to model 802 as inputs to train model 802. For example, the system may receive a first labeled feature input, wherein the first labeled feature input is labeled with a known incident for the first labeled feature input (e.g., based on labeled processing tasks, dynamically selected sequence, etc.). The system may then train the first machine learning model to classify the first labeled feature input with the predicted processing tasks, dynamically selected sequence, etc.

In another embodiment, model 802 may update its configurations (e.g., weights, biases, or other parameters) based on the assessment of its prediction (e.g., outputs 806) and reference feedback information (e.g., user indication of accuracy, reference labels, or other information). In another embodiment, where model 802 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 802 may be trained to generate better predictions.

In some embodiments, model 802 may include an artificial neural network. In such embodiments, model 802 may include an input layer and one or more hidden layers. Each neural unit of model 802 may be connected with many other neural units of model 802. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 802 may be self-learning and trained, rather than explicitly programmed, and can perform significantly better in certain areas of problem solving, as compared to traditional computer programs. During training, an output layer of model 802 may correspond to a classification of model 802 and an input known to correspond to that classification may be input into an input layer of model 802 during training. During testing, an input without a known classification may be input into the input layer and a determined classification may be output.

In some embodiments, model 802 may include multiple layers (e.g., where a signal path traverses from front layers to back layers). In some embodiments, back propagation techniques may be utilized by model 802 where forward stimulation is used to reset weights on the "front" neural units. In some embodiments, stimulation and inhibition for model 802 may be more free-flowing, with connections interacting in a more chaotic and complex fashion. During testing, an output layer of model 802 may indicate whether or not a given input corresponds to a classification of model 802 (e.g., an incident).

For example, in some embodiments, the system may train a machine learning model (e.g., an artificial neural network) to predict complete dynamically selected sequences for requests based on portions of dynamically selected sequences. The system may then generate a series of features inputs based on the training data. For example, the system may generate a first feature input based on training data comprising labeled portions of dynamically selected sequences (e.g., a first subset of processing tasks in a given request). The system may label the first feature input with the second subset of processing tasks in the given request (e.g., a second portion of the dynamically selected sequence).

The system may then train a machine learning model to predict complete dynamically selected sequences for requests based on portions of dynamically selected sequences (e.g., feature inputs based on labeled portions of dynamically selected sequences). The system may also train a machine learning model (e.g., the same or different machine learning model) to predict potential application status (e.g., an error state). For example, the training process may involve initializing some random values for each of the training matrixes (e.g., of a machine learning model) and attempting to predict the output of the input feature using the initial random values. Initially, the error of the model will be large, but comparing the model's prediction with the correct output (e.g., the know classification), the model is able to adjust the weights and biases values until having the model provides the required predictions.

System 800 also includes API layer 850. For example, in some embodiments, the system may be implemented as one or more APIs and/or an API layer. In some embodiments, API layer 850 may be implemented on user device 822 or user terminal 824. Alternatively or additionally, API layer 850 may reside on one or more of cloud components 810. API layer 850 (which may be A REST or Web services API layer) may provide a decoupled interface to data and/or functionality of one or more applications. API layer 850 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B processing tasks.

API layer 850 may use various architectural arrangements. For example, system 800 may be partially based on API layer 850, such that there is strong adoption of SOAP and RESTful Web-services, using resources like Service Repository and Developer Portal but with low governance, standardization, and separation of concerns. Alternatively, system 800 may be fully based on API layer 850, such that separation of concerns between layers like API layer 850, services, and applications are in place.

In some embodiments, the system architecture may use a microservice approach. Such systems may use two types of layers: Front-End Layer and Back-End Layer where microservices reside, in this kind of architecture, the role of the API layer 850 may provide integration between Front-End and Back-End. In such cases, API layer 850 may use RESTful APIs (exposition to front-end or even communication between microservices). API layer 850 may use AMQP (e.g., Kafka, RabbitMQ, etc.). API layer 850 may use incipient usage of new communications protocols such as gRPC, Thrift, etc.

In some embodiments, the system architecture may use an open API approach. In such cases, API layer 850 may use commercial or open source API Platforms and their modules. API layer 850 may use developer portal. API layer 850 may use strong security constraints applying WAF and DDoS protection, and API layer 850 may use RESTful APIs as standard for external integration.

Figure 9:
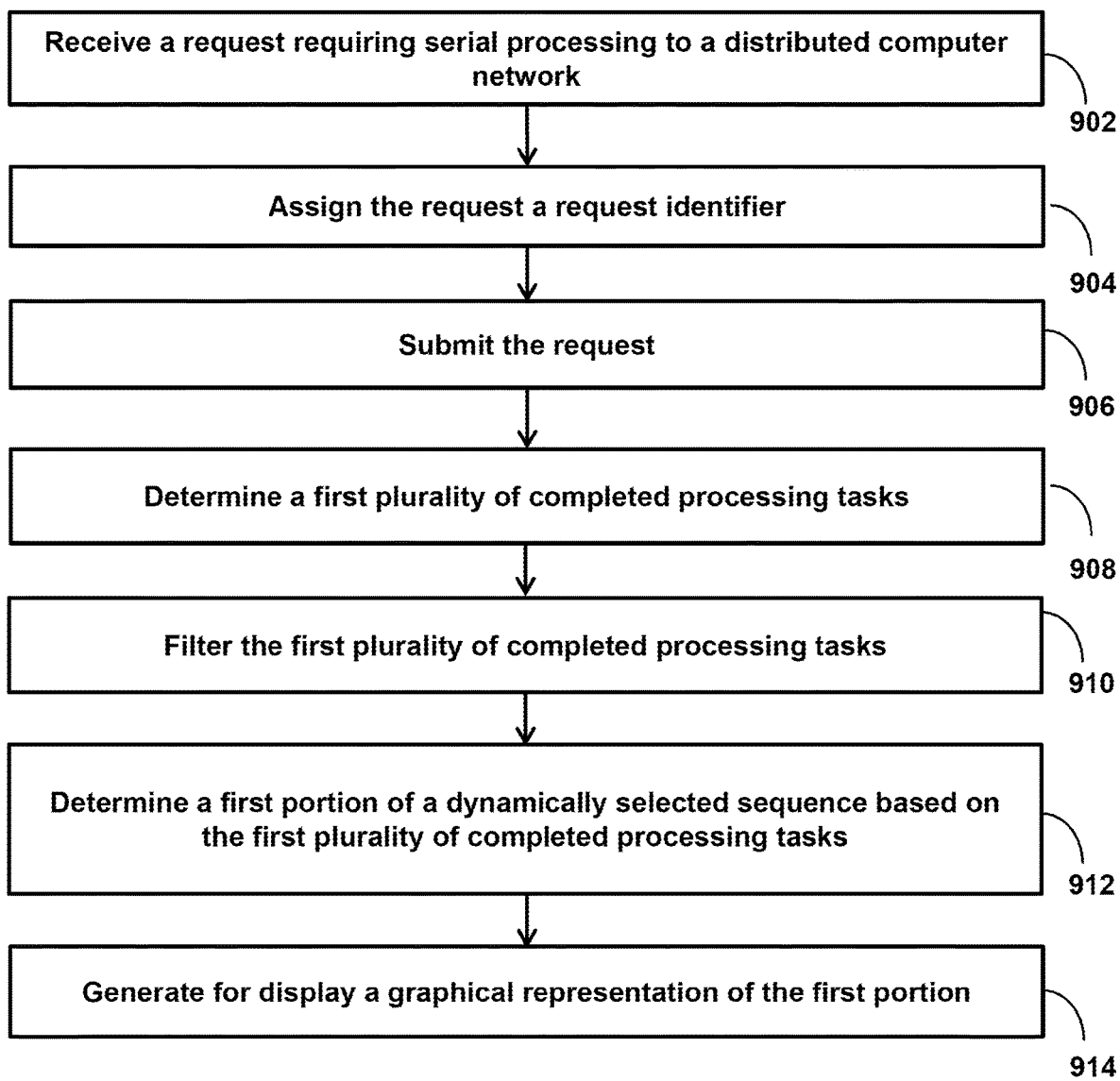
FIG. 9 depicts a flow process for improving resiliency during serial processing tasks in distributed computer networks, in accordance with an embodiment.

FIG. 9 depicts a flow process for improving resiliency during serial processing tasks in distributed computer networks, in accordance with an embodiment. For example, FIG. 9 shows process 900, which may be implemented by one or more devices. The system may implement process 900 in order to generate one or more of the user interfaces (e.g., as described in FIGS. 7-8) and/or utilize blockchains, which may in some cases improve hardware resiliency. For example, process 900 may overcome the technical hurdles with hardware resiliency during serial processing tasks in distributed computer networks. As an example, a serial processing task may comprise a request to complete a business transaction (e.g., complete a request for a wire transfer). The system may submit the request to the system and the system may perform one or more processing tasks to complete the business transaction.

At step 902, process 900 (e.g., using control circuitry and/or one or more components described in FIGS. 1-7) receives a request requiring serial processing to a distributed computer network. For example, the system may receive a request requiring serial processing to a distributed computer network, wherein the distributed computer network comprises a plurality of applications that each perform a respective processing task, wherein completing the serial processing of the request comprises performing a plurality of respective processing tasks in a dynamically selected sequence, and wherein a first result of a first respective processing task of the plurality of the respective processing tasks and a first time stamp (e.g., the first time stamp may indicate a time when the first respective processing task is completed) of the first respective processing task is recorded in all subsequent results of respective processing tasks of the plurality of the respective processing tasks. In some embodiments, the first result may comprise details specific to the first respective processing task formatted using the network-specific schema. For example, the details may include a value (or series of values) determined by the first respective processing task.

For example, the dynamically selected sequence may be a sequence wherein a subsequent processing task of the plurality of respective processing tasks is determined in response to a result of a previous processing task. That is, due to the complexity of the distributed computer network and/or the fact that subsequently required processing tasks (and/or the application required to process those tasks) may not be known (or determinable) when the request is received and/or until an immediately preceding processing task in the series of processing tasks required for the request is complete. For example, neither the plurality of the respective processing tasks required to complete the serial processing of the request nor the dynamically selected sequence may be known until after the request is submitted to the distributed computer network.

In some embodiments, the system may use machine learning to anticipate a portion of the dynamically selected sequence. For example, the machine learning model may be trained to predict complete dynamically selected sequences for requests based on portions of dynamically selected sequences. In such cases, the system may generate a feature input based on the first portion of the dynamically selected sequence. The system may then input the feature input into a machine learning model, wherein the machine learning model is trained to predict complete dynamically selected sequences for requests based on portions of dynamically selected sequences. The system may receive an output of the machine learning model. The system may then determine a prediction of a second portion of the dynamically selected sequence based on the output. The system may then generate for display, on the user interface, a graphical representation of the prediction simultaneously with the graphical representation of the first portion of the dynamically selected sequence At step 904, process 900 (e.g., using control circuitry and/or one or more components described in FIGS. 1-7) assigns the request a request identifier. For example, the system may assign the request a request identifier, wherein the request identifier is formatted using a network-specific schema. For example, each result from a respective processing task of the plurality of respective processing tasks may include a portion of a blockchain that is uniquely identifiable and carries the results of previous processing tasks in the series of processing task of the plurality of respective processing tasks. For example, the lineage discovery, which turns on the messaging protocol, may cause each message to be uniquely identifiable based on the blockchain. For example, the system may transform (e.g., normalization) all requests into a network-wide and/or network specific schema in real-time. The schema may identify the different attributes and measures that needs to be put in place for a request (e.g., amount, client, destination, payer) as well as mandated fields (e.g., time stamps, status identifiers, etc.). For example, a processing task may correspond to a blockchain transaction and/or result thereof. Each processing task may correspond to a given transaction and/or a series of transactions and the each processing task may generate a blockchain lineage (e.g., a digital ledger of transactions that is duplicated and distributed across the entire network of computer systems on the blockchain). The request identifier may be included in each of these lineages.

At step 906, process 900 (e.g., using control circuitry and/or one or more components described in FIGS. 1-7) submits the request. For example, the system may submit the request to the distributed computer network. For example, as shown in FIG. 5 above, the system may submit a request, which requires a series of processing tasks to the distributed computer network. As the request is processed through the distributed computer network, the system may execute each of the processing tasks in the series in a sequence. The execution of each of these tasks may be recorded in the blockchain lineage of a blockchain that results from each processing task.

At step 908, process 900 (e.g., using control circuitry and/or one or more components described in FIGS. 1-7) determines a first plurality of completed processing tasks. For example, the system may determine a first plurality of completed processing tasks in response to submitting the request, wherein the first plurality of completed processing tasks comprises all processing tasks completed by the plurality of applications for all requests during a time period, and wherein the time period begins when the request is submitted to the distributed computer network. For example, the system may iteratively determine the status of all processing tasks completed by the plurality of applications for all requests during the time period. For example, the system may retrieve blockchain lineages resulting from each completed transaction. Each application may perform an individual transaction that is updated to the lineage of the blockchain (i.e., the blockchain ledger or record of all past transactions). Each application (e.g., which may be responsible for checking a credit score, verifying account liquidity, etc. along a wire verification process) results in an individual transaction occurring at that application. The blockchain lineage is then updated with a "result" (or "message") of that transaction. This may cause a single blockchain lineage to have different lengths after different transactions. For example, a blockchain lineage following a first transaction may record transaction one, a blockchain lineage following the first transaction and then a second transaction may record transaction one and transaction two, a blockchain lineage following a third transaction may record transaction one, two, and three.

At step 910, process 900 (e.g., using control circuitry and/or one or more components described in FIGS. 1-7) filters the first plurality of completed processing tasks. For example, the system may filter the first plurality of completed processing tasks based on the request identifier to identify a second plurality of completed processing tasks, wherein the second plurality of completed processing tasks comprises processing tasks completed by the plurality of applications for the request. For example, the system may be able to perform searches for one or more requests, processing tasks, and/or application statuses (e.g., vie user inputs into a user interface (e.g., user interface 600 (FIG. 6) and 700 (FIG. 7)). For example, the system may filter blockchain lineages resulting from each completed transaction.

At step 912, process 900 (e.g., using control circuitry and/or one or more components described in FIGS. 1-7) determines a first portion of a dynamically selected sequence based on the first plurality of completed processing tasks. For example, the system may determine a first portion of the dynamically selected sequence based on ordering respective time stamps for each of the second plurality of completed processing tasks. For example, the system may search each of these "multiple" blockchain lineages (each corresponding to the same request). The system then filters (based on a unique ID) all blockchain lineages to identify all block chain lineages corresponding to result. The system then looks to see which blockchain lineage was last (based on the last received time stamp). Based on the last transaction, the system determines previous route and provide a current status of the request. The system may then use this information to predict where the request is heading (what applications is likely to be used next) and check for potential issues (e.g., a downed server, etc.). At step 914, process 900 (e.g., using control circuitry and/or one or more components described in FIGS. 1-7) generates for display a graphical representation of the first portion. For example, the system may generate for display, in a user interface, a graphical representation of the first portion of the dynamically selected sequence. For example, the system may identify the exact set of computing applications between which a request and/or processing tasks for the request are stuck and alert a user and/or summarize the specifics of the request, the error encountered, and/or the processing tasks In some embodiments, the system may generate graphical representations based on one or more triggers. The triggers may be based on a length of time since a processing task in the series of processing tasks for the request was last completed. For example, the system may determine a length of time since a final time stamp of the respective time stamps. The system may compare the length of time to a threshold length of time. In response to determining that the length of time equals or exceeds the threshold length of time, the system may generate for display, in the user interface, an alert. Alternatively or additionally, the system may also generate information about a current, previous, and/or future processing task in the series of processing tasks for a request. For example, the system may determine a length of time since a final time stamp of the respective time stamps. The system may then compare the length of time to a threshold length of time. The system may then in response to determining that the length of time equals or exceeds the threshold length of time, retrieve information related to a completed processing task of the second plurality of completed processing tasks corresponding to the final time stamp. The system may then generate for display, in the user interface, the information.

For example, the system may determine that the first result does not indicate that the request has been completed. In some embodiments, the system may receive a second result of a second respective processing task of the plurality of the respective processing tasks and a second time stamp of the second respective processing task. The system may then determine whether the second result corresponds to a completion the serial processing of the request. For example, in response to determining that the second result corresponds to the completion the serial processing of the request, the system may end the time period (and consequently the system may stop iteratively determining the completed tasks by the plurality of applications for all requests). Alternatively, in response to determining that the second result does not corresponds to the completion the serial processing of the request, continuing the time period (and consequently the system may continue iteratively determining the completed tasks by the plurality of applications for all requests).

It is contemplated that the steps or descriptions of FIG. 9 may be used with any other embodiment of this disclosure. In addition, the steps and descriptions described in relation to FIG. 9 may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-8 and 11 could be used to perform one of more of the steps in FIG. 9.

Process for Managing Processing Task States

Figure 10A:
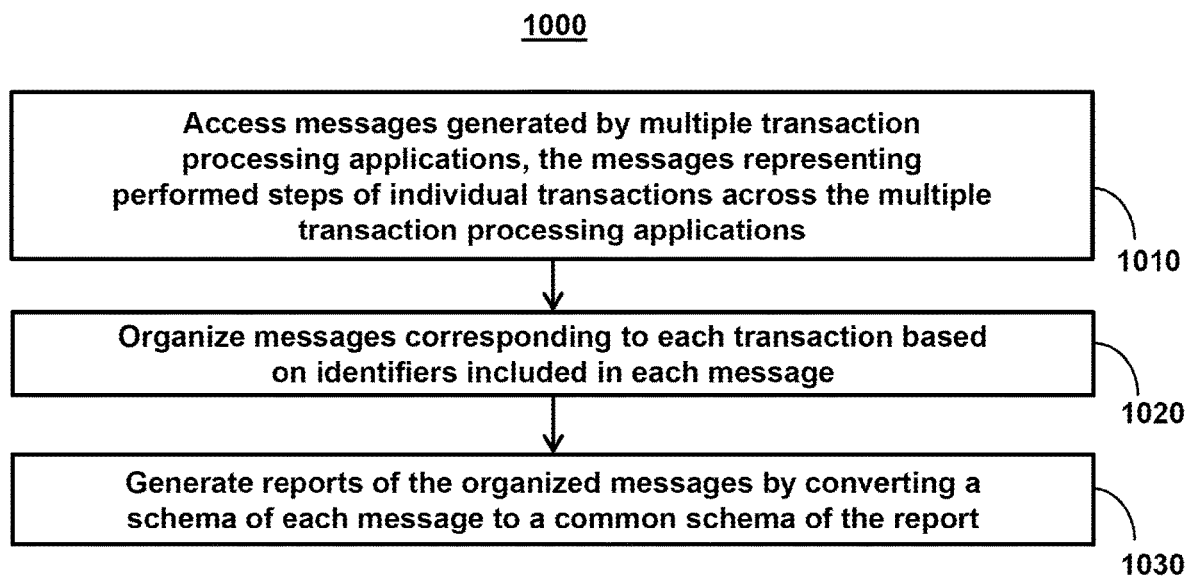
FIG. 10A depicts a flow process for generating results of performed steps of processing tasks, in accordance with an embodiment.

FIG. 10A depicts a flow process 1000 for generating results of performed steps of processing tasks, in accordance with an embodiment. For example, FIG. 10A shows process 1000, which may be implemented by one or more devices. The system may implement process 1000 in order to generate one or more of the user interfaces (e.g., as described in FIGS. 7-8) and/or utilize blockchains to improve hardware resiliency. For example, process 1000 may overcome the technical hurdles with hardware resiliency during serial processing tasks in distributed computer networks.

At step 1010, process 1000 (e.g., using control circuitry and/or one or more components described in FIGS. 1-7) accesses messages generated by multiple processing task processing applications 110. For example, each message may represent a step of a processing task performed by a processing task processing application 110.

At step 1020, process 1000 (e.g., using control circuitry and/or one or more components described in FIGS. 1-7) organizes messages that each correspond to a particular processing task, based on the identifiers included in the messages. In one embodiment, the result system 150 identifies messages that correspond to a particular system based on the linkage identifier and/or the carry forward identifier included in each message. In one embodiment, the result system 150 organizes messages based on the action identifier and/or the order identifier included in each message. Altogether, the result system 150 organizes a set of messages that is particular for a single processing task performed across multiple processing task processing applications.

At step 1030, process 1000 (e.g., using control circuitry and/or one or more components described in FIGS. 1-7) generates results of the organized set of messages. More specifically, for each message in the organized set, the result system 150 determines a schema of the message and converts the schema of the message to a common schema. For example, the result system 150 ensures that information in the results, which are derived from messages accessed from varying processing task processing applications, are consistently organized such that the results can be effectively stored, e.g., in a blockchain.

It is contemplated that the steps or descriptions of FIG. 10A may be used with any other embodiment of this disclosure. In addition, the steps and descriptions described in relation to FIG. 10A may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-8 and 11 could be used to perform one of more of the steps in FIG. 10A.

Figure 10B:
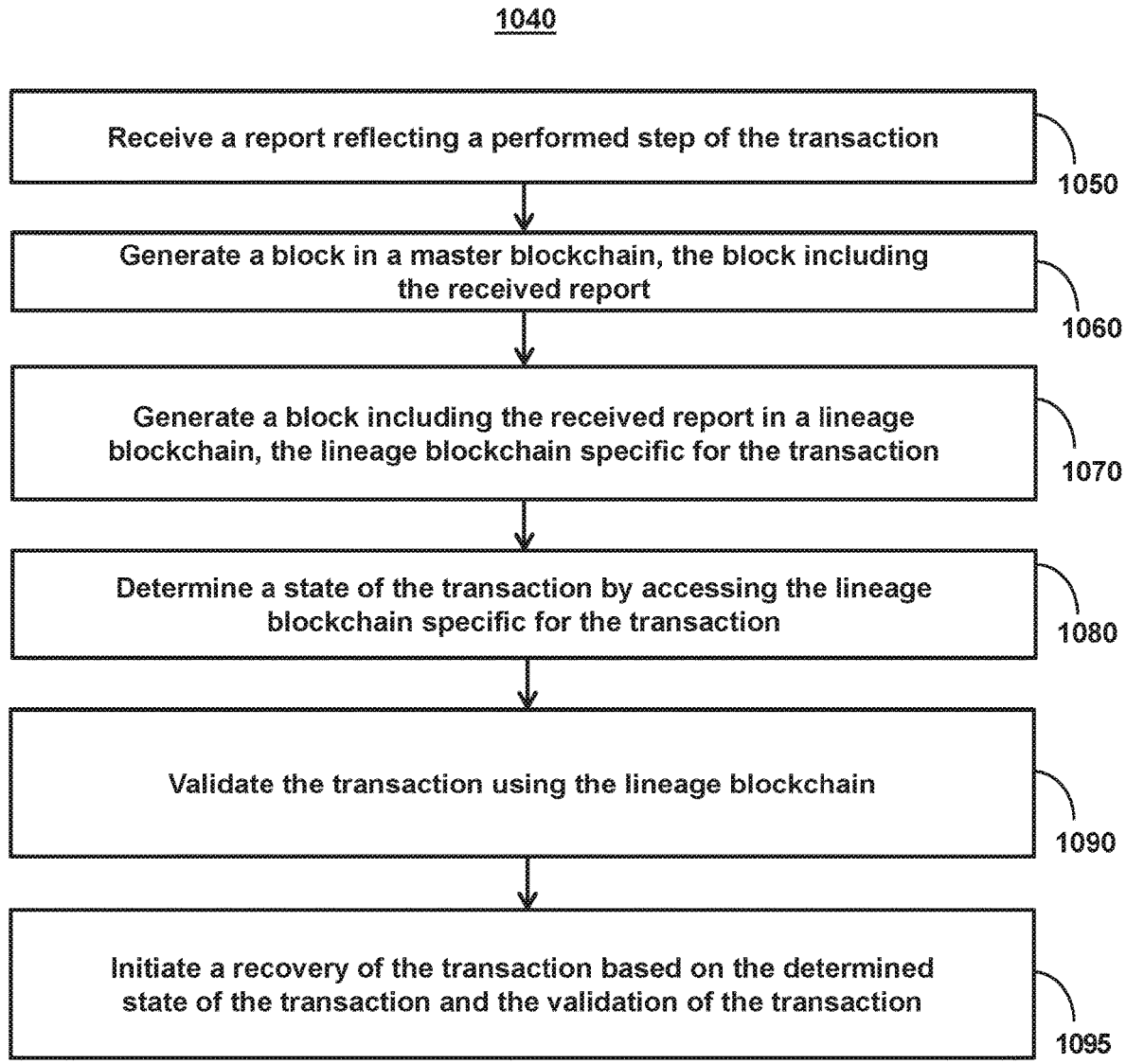
FIG. 10B depicts a flow process for managing states of processing tasks using immutable lineages, in accordance with an embodiment.

FIG. 10B depicts a flow process 1040 for managing states of processing tasks using immutable lineages, in accordance with an embodiment. For example, FIG. 10B shows process 1040, which may be implemented by one or more devices. The system may implement process 1040 in order to generate one or more of the user interfaces (e.g., as described in FIGS. 7-8) and/or utilize blockchains to improve hardware resiliency. For example, process 1040 may overcome the technical hurdles with hardware resiliency during serial processing tasks in distributed computer networks.

At step 1050, process 1040 (e.g., using control circuitry and/or one or more components described in FIGS. 1-7) receives a result representing a performed step of the processing task.

At step 1060, process 1040 (e.g., using control circuitry and/or one or more components described in FIGS. 1-7) generates a block that includes the received result in a master blockchain. Here, the blocks of results in the master blockchain include results that correspond to performed steps of different processing tasks. The blocks of results in the master blockchain are immutably linked through block hash values.

At step 1070, process 1040 (e.g., using control circuitry and/or one or more components described in FIGS. 1-7) generates a block of results including the received result in a lineage blockchain. The lineage blockchain is specific for the processing task and only includes results that correspond to the performed steps in the processing task, in the order of their creation.

At step 1080, process 1040 (e.g., using control circuitry and/or one or more components described in FIGS. 1-7) determines a state of the processing task by accessing the lineage blockchain specific for the processing task. For example, the tracking system 160 accesses the results in the final block of the lineage blockchain to determine whether the processing task is currently in a mid-processing state or if the processing task has completed and is in an expected termination state.

At step 1090, process 1040 (e.g., using control circuitry and/or one or more components described in FIGS. 1-7) validates the processing task using the lineage blockchain. For example, if the processing task has been in a mid-processing state for an extended amount of time, the tracking system 160 may validate 590 the processing task using the lineage blockchain. Specifically, the tracking system 160 validates the block hash values of the lineage blockchain.

At step 1095, process 1040 (e.g., using control circuitry and/or one or more components described in FIGS. 1-7) initiates a recovery of the processing task based on the determined state of the processing task and the validation of the processing task. The tracking system 160 can provide a request that includes the determined state of the processing task to a processing task processing application 110 to continue processing the processing task. Thus, the tracking system 160 ensures that the processing task can be completed as intended.

It is contemplated that the steps or descriptions of FIG. 10B may be used with any other embodiment of this disclosure. In addition, the steps and descriptions described in relation to FIG. 10B may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-8 and 11 could be used to perform one of more of the steps in FIG. 10B.

Example Computing Device

Figure 11:
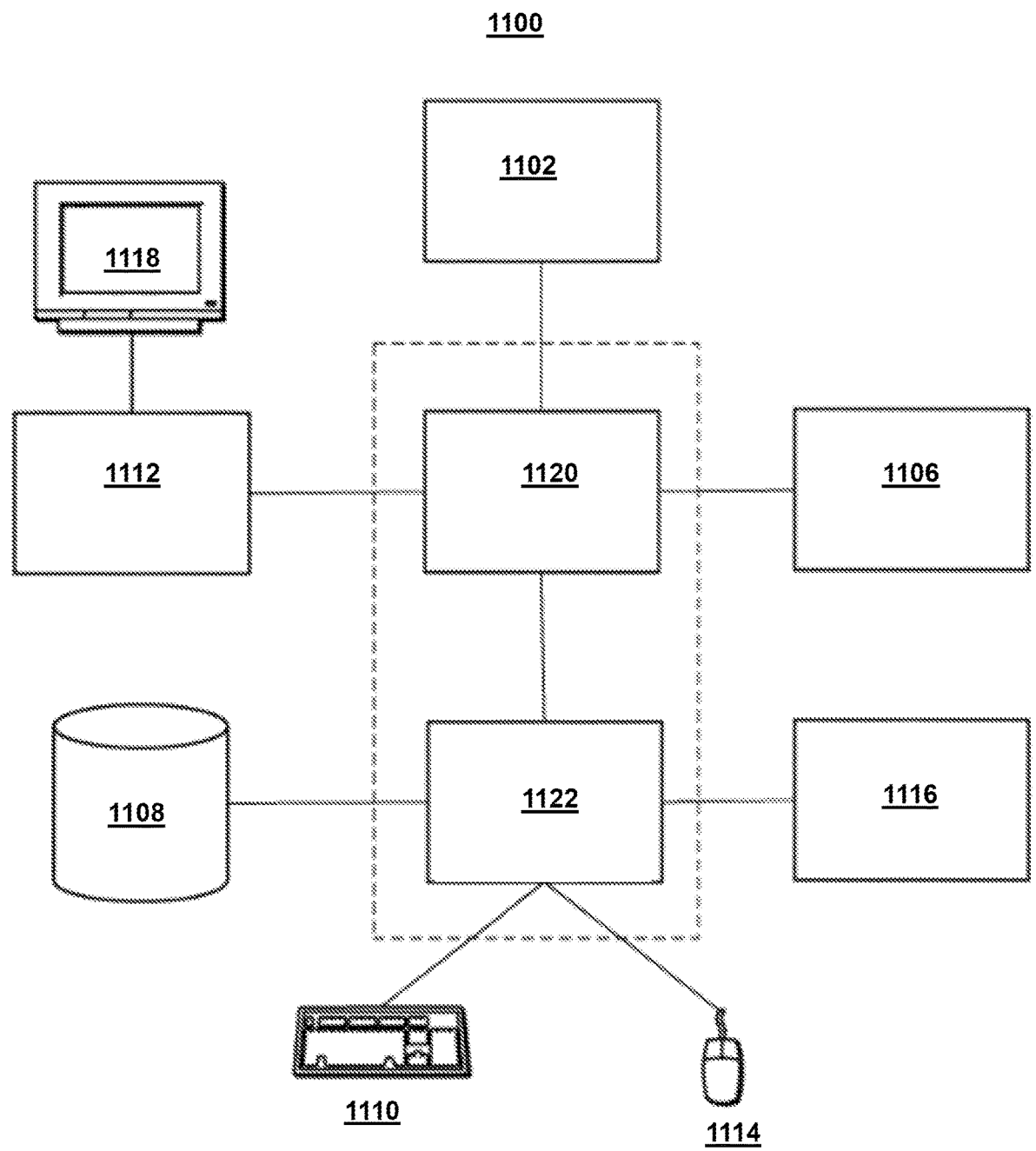
FIG. 11 is a high-level block diagram illustrating physical components of a computer, in accordance with an embodiment.

FIG. 11 is a high-level block diagram illustrating physical components of a computer 1100 used as part or all of one or more of the entities described herein in one embodiment. For example, instances of the illustrated computer 1100 may be a computing device that operates a processing task processing application 110 or a computing device that operates a result system 150 and tracking system 160. Illustrated are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O hub 1122. In another embodiment, the memory 1106 is coupled directly to the processor 1102 instead of the chipset 1104.

The storage device 1108 is any non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer 1100. The graphics adapter 1112 displays images and other information on the display 1118. The network adapter 1116 couples the computer 1100 to a local or wide area network.

As is known in the art, a computer 1100 can have different and/or other components than those shown in FIG. 11. In addition, the computer 1100 can lack certain illustrated components. In one embodiment, a computer 1100 acting as a server may lack a keyboard 1110, pointing device 1114, graphics adapter 1112, and/or display 1118. Moreover, the storage device 1108 can be local and/or remote from the computer 1100 (such as embodied within a storage area network (SAN)).

As is known in the art, the computer 1100 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 1106, and executed by the processor 1102.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A computer-implemented method comprising: receiving a result representing a performed step of a processing task performed across multiple processing task processing applications; generating a first block of results in a master blockchain, the first block of results including the received result, the master blockchain further including at least one result representing a performed step of a different processing task; parsing the master blockchain to obtain results that are associated with the specific processing task, the obtained results including the received result; organizing the obtained results from the processing task into an order in which the results were created, the order corresponding to an order of steps in the processing task; generating a lineage blockchain specific for the processing task, the lineage blockchain storing the results in the organized order; determining a state of the processing task performed across the multiple processing task processing applications by querying the lineage blockchain specific for the processing task and accessing a final result in the lineage blockchain specific to the processing task; determining that the final result in the lineage blockchain specific to the processing task indicates a mid-processing state of the processing task;

sending a request to one or more of the processing task processing applications to continue remaining steps of the processing task; subsequently to sending the request to one or more of the processing task processing applications, determining an updated state of the processing task by accessing a new final result in the lineage blockchain specific for the processing task; and responsive to determining that the updated state of the processing task represents a termination state of the processing task, removing the lineage blockchain from memory.

2. The method of any preceding embodiment, wherein organizing results that are specific for the processing task is further based on entities that processed steps of the processing task that correspond to the results.

3. The method of any preceding embodiment, wherein determining that the final result in the lineage blockchain specific to the processing task indicates a mid-processing state of the processing task comprises determination that the final block of results does not include the result representing the termination state.

4. The method of any preceding embodiment, further comprising: responsive to determining that the result in the final block of results does not represent a termination state, validating the processing task using the lineage blockchain.

5. The method of any preceding embodiment, wherein validating the processing task using the lineage blockchain comprises validating hash values of blocks in the lineage blockchain to ensure validity of results in the lineage blockchain.

6. The method of any preceding embodiment, wherein a request to continue the remaining steps of the processing task identifies the determined state of the processing task.

7. A method, the method comprising: receiving a request requiring serial processing to a distributed computer network, wherein the distributed computer network comprises a plurality of applications that each perform a respective processing task, wherein completing the serial processing of the request comprises performing a plurality of respective processing tasks in a dynamically selected sequence, and wherein a first result of a first respective processing task of the plurality of the respective processing tasks and a first time stamp of the first respective processing task is recorded in all subsequent results of respective processing tasks of the plurality of the respective processing tasks; assigning the request a request identifier, wherein the request identifier is formatted using a network-specific schema; submitting the request to the distributed computer network; in response to submitting the request, determining a first plurality of completed processing tasks, wherein the first plurality of completed processing tasks comprises all processing tasks completed by the plurality of applications for all requests during a time period, and wherein the time period begins when the request is submitted to the distributed computer network; filtering the first plurality of completed processing tasks based on the request identifier to identify a second plurality of completed processing tasks, wherein the second plurality of completed processing tasks comprises processing tasks completed by the plurality of applications for the request; determining a first portion of the dynamically selected sequence based on ordering respective time stamps for each of the second plurality of completed processing tasks; and generating for display, in a user interface, a graphical representation of the first portion of the dynamically selected sequence.

8. The method of any preceding embodiment, further comprising: receiving a second result of a second respective processing task of the plurality of the respective processing tasks and a second time stamp of the second respective processing task; determining whether the second result corresponds to a completion the serial processing of the request; in response to determining that the second result corresponds to the completion the serial processing of the request, ending the time period; and in response to determining that the second result does not corresponds to the completion the serial processing of the request, continuing the time period.

9. The method of any preceding embodiment, wherein the dynamically selected sequence is a sequence wherein a subsequent processing task of the plurality of respective processing tasks is determined in response to a result of a previous processing task.

10. The method of any preceding embodiment, wherein neither the plurality of the respective processing tasks required to complete the serial processing of the request nor the dynamically selected sequence is known until after the request is submitted to the distributed computer network.

11. The method of any preceding embodiment, wherein the first time stamp indicates a time when the first respective processing task is completed.

12. The method of any preceding embodiment, furthering comprising: generating a feature input based on the first portion of the dynamically selected sequence; inputting the feature input into a machine learning model, wherein the machine learning model is trained to predict complete dynamically selected sequences for requests based on portions of dynamically selected sequences; receiving an output of the machine learning model; determining a prediction of a second portion of the dynamically selected sequence based on the output; and generating for display, on the user interface, a graphical representation of the prediction simultaneously with the graphical representation of the first portion of the dynamically selected sequence.

13. The method of any preceding embodiment, further comprising: determining a subset of the plurality of applications that correspond to the second portion; and verifying a status of each of the plurality of applications of the subset.

14. The method of any preceding embodiment, further comprising: determining a length of time since a final time stamp of the respective time stamps; comparing the length of time to a threshold length of time; and in response to determining that the length of time equals or exceeds the threshold length of time, generating for display, in the user interface, an alert.

15. The method of any preceding embodiment, further comprising: determining a length of time since a final time stamp of the respective time stamps; comparing the length of time to a threshold length of time; in response to determining that the length of time equals or exceeds the threshold length of time, retrieving information related to a completed processing task of the second plurality of completed processing tasks corresponding to the final time stamp; and generating for display, in the user interface, the information.

16. The method of any preceding embodiment, wherein the first result comprises details specific to the first respective processing task formatted using the network-specific schema.

17. A tangible, non-transitory, machine-readable medium storing instructions that, when executed by a data processing apparatus, cause the data processing apparatus to perform operations comprising those of any of embodiments 1-16.

18. A system comprising: one or more processors and memory storing instructions that, when executed by the processors, cause the processors to effectuate operations comprising those of any of embodiments 1-16.

19. A system comprising means for performing any of embodiments 1-16.

What is claimed is:

1. A system for improving hardware resiliency during serial processing tasks in distributed computer networks using blockchains, the system comprising:

cloud-based storage circuitry configured to store a plurality of applications across a distributed computer network that each perform a respective processing task;
control circuitry configured to:
receive a request requiring serial processing to a distributed computer network, wherein the distributed computer network comprises a plurality of applications that each perform a respective processing task, wherein completing the serial processing of the request comprises performing a plurality of respective processing tasks in a dynamically selected sequence, wherein a first result of a first respective processing task of the plurality of the respective processing tasks and a first time stamp of the first respective processing task is recorded in all subsequent results of respective processing tasks of the plurality of the respective processing tasks, and wherein the first result comprises details specific to the first respective processing task formatted using a network-specific schema;
assign the request a request identifier, wherein the request identifier is formatted using the network-specific schema;
submit the request to the distributed computer network;
determine a first plurality of completed processing tasks in response to submitting the request, wherein the first plurality of completed processing tasks comprises all process tasks completed by the plurality of applications for all requests during a time period, wherein the request is one of the all requests received in the distributed computer network, and wherein the time period begins when the request is submitted to the distributed computer network;
filter the first plurality of completed processing tasks based on the request identifier to identify a second plurality of completed processing tasks, wherein the second plurality of completed processing tasks comprises processing tasks completed by the plurality of applications for the request;
determine a first portion of the dynamically selected sequence based on ordering respective time stamps for each of the second plurality of completed processing tasks, wherein the first portion of the dynamically selected sequence indicates a lineage or processing route of the request through the distributed computer network;
determine a length of time since a final time stamp of the respective time stamps, wherein the final time stamp is a time stamp of a last completed processing task of the second plurality of completed processing tasks;
compare the length of time to a threshold length of time;
retrieve information related to a completed processing task of the second plurality of completed processing tasks corresponding to the final time stamp in response to determining that the length of time equals or exceeds the threshold length of time;
generate a feature input based on the first portion of the dynamically selected sequence;
input the feature input into a machine learning model, wherein the machine learning model is trained to predict complete dynamically selected sequences for requests based on portions of dynamically selected sequences;
receive an output of the machine learning model;
determine a prediction of a second portion of the dynamically selected sequence based on the output;
receive a second result of a second respective processing task of the plurality of the respective processing tasks and a second time stamp of the second respective processing task;
determine whether the second result corresponds to a completion of the serial processing of the request;
in response to determining that the second result corresponds to the completion of the serial processing of the request, end the time period; and
in response to determining that the second result does not correspond to the completion of the serial processing of the request, continue the time period; and
input/output circuitry configured to:
generate for display, in a user interface, a graphical representation of the prediction simultaneously with a graphical representation of the first portion of the dynamically selected sequence.

2. A method for improving hardware resiliency during serial processing tasks in distributed computer networks using blockchains, the method comprising:
receiving a request requiring serial processing to a distributed computer network, wherein the distributed computer network comprises a plurality of applications that each perform a respective processing task, wherein completing the serial processing of the request comprises performing a plurality of respective processing tasks in a dynamically selected sequence, and wherein a first result of a first respective processing task of the plurality of the respective processing tasks and a first time stamp of the first respective processing task is recorded in all subsequent results of respective processing tasks of the plurality of the respective processing tasks;
assigning the request a request identifier, wherein the request identifier is formatted using a network-specific schema;
submitting the request to the distributed computer network;
in response to submitting the request, determining a first plurality of completed processing tasks, wherein the first plurality of completed processing tasks comprises all processing tasks completed by the plurality of applications for all requests during a time period, wherein the request is one of the all requests received in the distributed computer network, and wherein the time period begins when the request is submitted to the distributed computer network;
filtering the first plurality of completed processing tasks based on the request identifier to identify a second plurality of completed processing tasks, wherein the second plurality of completed processing tasks comprises processing tasks completed by the plurality of applications for the request;
determining a first portion of the dynamically selected sequence based on ordering respective time stamps for each of the second plurality of completed processing tasks, wherein the first portion of the dynamically selected sequence indicates a lineage or processing route of the request through the distributed computer network;
generating a feature input based on the first portion of the dynamically selected sequence;
inputting the feature input into a machine learning model, wherein the machine learning model is trained to predict complete dynamically selected sequences for requests based on portions of dynamically selected sequences;

receiving an output of the machine learning model;

determining a prediction of a second portion of the dynamically selected sequence based on the output;

generating for display, in a user interface, a graphical representation of the prediction simultaneously with a graphical representation of the first portion of the dynamically selected sequence;

receiving a second result of a second respective processing task of the plurality of the respective processing tasks and a second time stamp of the second respective processing task;

determining whether the second result corresponds to a completion of the serial processing of the request;

in response to determining that the second result corresponds to the completion of the serial processing of the request, ending the time period; and in response to determining that the second result does not correspond to the completion of the serial processing of the request, continuing the time period.

3. The method of claim 2, wherein the dynamically selected sequence is a sequence wherein a subsequent processing task of the plurality of respective processing tasks is determined in response to a result of a previous processing task.

4. The method of claim 2, wherein neither the plurality of the respective processing tasks required to complete the serial processing of the request, nor the dynamically selected sequence, is known until after the request is submitted to the distributed computer network.

5. The method of claim 2, wherein the first time stamp indicates a time when the first respective processing task is completed.

6. The method of claim 2, further comprising:
determining a subset of the plurality of applications that correspond to the second portion;
verifying a status of each of the plurality of applications of the subset; and
generating for display, in the user interface, a status update for each of the plurality of applications of the subset.

7. The method of claim 2, further comprising:
determining a length of time since a final time stamp of the respective time stamps;
comparing the length of time to a threshold length of time; and
in response to determining that the length of time equals or exceeds the threshold length of time, generating for display, in the user interface, an alert.

8. The method of claim 2, further comprising:
determining a length of time since a final time stamp of the respective time stamps;
comparing the length of time to a threshold length of time;
in response to determining that the length of time equals or exceeds the threshold length of time, retrieving information related to a completed processing task of the second plurality of completed processing tasks corresponding to the final time stamp; and
generating for display, in the user interface, the information.

9. The method of claim 2, wherein the first result comprises details specific to the first respective processing task formatted using the network-specific schema.

10. A non-transitory, computer-readable medium for improving hardware resiliency during serial processing tasks in distributed computer networks using blockchains, comprising instructions that, when executed by one or more processors, cause operations comprising:

receiving a request requiring serial processing to a distributed computer network, wherein the distributed computer network comprises a plurality of applications that each perform a respective processing task, wherein completing the serial processing of the request comprises performing a plurality of respective processing tasks in a dynamically selected sequence, and wherein a first result of a first respective processing task of the plurality of the respective processing tasks and a first time stamp of the first respective processing task is recorded in all subsequent results of respective processing tasks of the plurality of the respective processing tasks;

assigning the request a request identifier, wherein the request identifier is formatted using a network-specific schema;

submitting the request to the distributed computer network;

in response to submitting the request, determining a first plurality of completed processing tasks, wherein the first plurality of completed processing tasks comprises all processing tasks completed by the plurality of applications for all requests during a time period, wherein the request is one of the all requests received in the distributed computer network, and wherein the time period begins when the request is submitted to the distributed computer network;

filtering the first plurality of completed processing tasks based on the request identifier to identify a second plurality of completed processing tasks, wherein the second plurality of completed processing tasks comprises processing tasks completed by the plurality of applications for the request;

determining a first portion of the dynamically selected sequence based on ordering respective time stamps for each of the second plurality of completed processing tasks, wherein the first portion of the dynamically selected sequence indicates a lineage or processing route of the request through the distributed computer network;

generating a feature input based on the first portion of the dynamically selected sequence;

inputting the feature input into a machine learning model, wherein the machine learning model is trained to predict complete dynamically selected sequences for requests based on portions of dynamically selected sequences;

receiving an output of the machine learning model;

determining a prediction of a second portion of the dynamically selected sequence based on the output;

generating for display, in a user interface, a graphical representation of the prediction simultaneously with a graphical representation of the first portion of the dynamically selected sequence;

receiving a second result of a second respective processing task of the plurality of the respective processing tasks and a second time stamp of the second respective processing task;

determining whether the second result corresponds to a completion of the serial processing of the request;

in response to determining that the second result corresponds to the completion of the serial processing of the request, ending the time period; and in response to determining that the second result does not correspond to the completion of the serial processing of the request, continuing the time period.

11. The non-transitory, computer-readable medium of claim 10, wherein the dynamically selected sequence is a sequence wherein a subsequent processing task of the plurality of respective processing tasks is determined in response to a result of a previous processing task.

12. The non-transitory, computer-readable medium of claim 10, wherein neither the plurality of the respective processing tasks required to complete the serial processing of the request, nor the dynamically selected sequence, is known until after the request is submitted to the distributed computer network.

13. The non-transitory, computer-readable medium of claim 10, wherein the first time stamp indicates a time when the first respective processing task is completed.

14. The non-transitory, computer-readable medium of claim 10, wherein the instructions further cause operations comprising:
- determining a subset of the plurality of applications that correspond to the second portion;
- verifying a status of each of the plurality of applications of the subset; and
- generating for display, in the user interface, a status update for each of the plurality of applications of the subset.

15. The non-transitory, computer-readable medium of claim 10, wherein the instructions further cause operations comprising:
- determining a length of time since a final time stamp of the respective time stamps;
- comparing the length of time to a threshold length of time; and
- in response to determining that the length of time equals or exceeds the threshold length of time, generating for display, in the user interface, an alert.

16. The non-transitory, computer-readable medium of claim 10, wherein the instructions further cause operations comprising:
- determining a length of time since a final time stamp of the respective time stamps;
- comparing the length of time to a threshold length of time;
- in response to determining that the length of time equals or exceeds the threshold length of time, retrieving information related to a completed processing task of the second plurality of completed processing tasks corresponding to the final time stamp; and
- generating for display, in the user interface, the information.

* * * * *